United States Patent [19]
Taki et al.

[11] Patent Number: 5,414,568
[45] Date of Patent: May 9, 1995

[54] VARIABLE SPEED DIGITAL SIGNAL REPRODUCING APPARATUS

[75] Inventors: Hideshi Taki, Hirakata; Takafumi Ueno, Nara; Shiro Tsuji, Mino; Masataka Nikaido, Hirakata; Nobuyoshi Kihara, Amagasaki, all of Japan

[73] Assignee: Matsushita Electric Industrial Co., Ltd., Kadoma, Japan

[21] Appl. No.: 156,941

[22] Filed: Nov. 24, 1993

Related U.S. Application Data

[63] Continuation of Ser. No. 720,507, Jul. 26, 1991, abandoned.

[30] Foreign Application Priority Data

Oct. 23, 1989 [JP] Japan .................................. 1-275291
Oct. 26, 1989 [JP] Japan .................................. 1-280501

[51] Int. Cl.6 .............................................. H04N 5/783
[52] U.S. Cl. .................... 360/19.1; 360/10.3; 360/35.1; 360/73.05
[58] Field of Search ............ 360/10.3, 18, 19.1, 360/35.1, 36.2, 61, 73.01, 73.04, 73.05, 77.01, 77.12, 77.14, 77.15

[56] References Cited

U.S. PATENT DOCUMENTS

| | | | |
|---|---|---|---|
| 4,163,993 | 8/1979 | Ravizza | 360/73.05 |
| 4,716,472 | 12/1987 | McNally | 360/8 |
| 4,799,113 | 1/1989 | Murakami | 360/32 |
| 4,816,929 | 3/1989 | Bradley et al. | 360/35.1 |
| 4,847,701 | 7/1989 | Suesada | 360/33.1 |
| 4,891,715 | 1/1990 | Levy | 360/33.1 |
| 4,905,099 | 2/1990 | Mester et al. | 360/10.1 |
| 4,963,992 | 10/1990 | Doi et al. | 360/33.1 |
| 5,041,925 | 8/1991 | Yamamoto et al. | 360/73.05 |

FOREIGN PATENT DOCUMENTS

| | | |
|---|---|---|
| 0209796 | 1/1987 | European Pat. Off. . |
| 173530 | 9/1987 | European Pat. Off. . |
| 58-166508 | 10/1983 | Japan . |
| 60-168269 | 8/1985 | Japan . |
| 61-3368 | 1/1986 | Japan . |
| 61-115275 | 6/1986 | Japan . |

OTHER PUBLICATIONS

Song Digital Videocassette Recorder DVR-10, D-2 Composite Digital Operation Manual, 1st Ed., "SN 10001 and Higher", Mar. 1988, pp. 2-133 & 3-118.

H. Matsushima, et al. "Digital Audio System for Professional Use", National Technical Report, vol. 26, No. 6, Dec. 1980, pp. 916-948.

Primary Examiner—Edward P. Westin
Assistant Examiner—Benjamin D. Driscoll
Attorney, Agent, or Firm—Cushman, Darby & Cushman

[57] ABSTRACT

A variable speed digital signal reproducing apparatus, particularly related to low speed reproduction of a digital signals recorded in a recording medium. The apparatus includes a unit for determining whether a reproduction PCM signal is renewed or not. Based on the renewal determination, PCM data of one frame is stored in a memory and the PCM data is read at a frequency rate corresponding to a tape reproducing speed at that time. Furthermore an interpolating device operates on the read PCM data to produce a PCM signal having the same frequency with which the PCM signal was read from the memory means.

4 Claims, 19 Drawing Sheets

VARIABLE SPEED DIGITAL SIGNAL REPRODUCING APPARATUS

This is a continuation of application Ser. No. 07/720,507, filed on Jul. 26, 1991, which was abandoned upon the filing hereof.

TECHNICAL FIELD

The present invention relates to a digital signal reproducing apparatus which reproduces voice or the like signal recorded in a recording medium by converting into digital, and particularly relates to that for low speed special reproduction. As a product in this field, a digital audio tape recorder is present for a voice recording-reproducing apparatus, and a digital video cassette recorder is present for an apparatus which records and reproduces voice with an image.

BACKGROUND ART

Recently, development is remarkable on what is called digital audio technology in that an analog signal of voice or the like is recorded and reproduced by converting into a digital signal. For example, a PCM processor using a mechanism of a VTR and a tape, a compact disc, more recently a digital audio tape recorder of a rotary head method (hereinafter is referred to as R-DAT), and moreover a digital VTR (hereinafter is referred to as D-VTR) which records not only a voice signal but also a video signal by converting into digital, are put to practical use. Furthermore, there is a product which is made to record only the audio signal by digitalizing in an exclusive area contiguous to an analog video signal track in the conventional VTR. All the VTR, R-DAT or the like are of what is called helical scan type which generates a PCM signal by sampling an audio or video signal, and records and reproduces by forming oblique tracks on a tape by a rotary head. Consequently, a relative speed by which the rotary head traces a track on the tape is always substantially constant in variable speed reproduction which is slower than the normal reproducing speed such as what is called JOG-MODE and VARI-MODE (variable speed playback mode). Therefore, a pitch (frequency) of reproduced sound does not vary as by the conventional method which records and reproduces in analog way by forming a track in the length direction of a tape and by using a stationary head even if a reproducing speed is varied.

Hereafter, the VTR is elucidated as an example.

In a VTR or the like for broadcasting use, an image signal of one frame is divided and is recorded in plural tracks in many cases. Therefore, in the case of the variable speed reproduction, a perfect image can not be reproduced, unless all the tracks of a set in which the image signal for the one frame is recorded are reproduced. For this reason, auto-tracking control (hereinafter is referred to as AT control) which controls the mounted height of a reproducing head by using a piezoelectric device is performed generally in order to correctly trace a desired track in variable speed reproduction. In many cases of the AT control, for example, the position of a target track is presumed on the basis of a control signal recorded in a control track for capstan servo which is formed along the length of the tape and a FG signal from the capstan, and moreover a tracking control is performed on the basis of the output level of a reproduced signal from the rotary head.

On the other hand, when slow speed reproduction is performed in an apparatus having no AT control such as the R-DAT, the rotary head sometimes traces on a track which is different in azimuth, and a reproduced output is severely reduced, and data error occurs during the period.

FIG. 16 is a figure showing a PCM signal output which is reproduced in the case that both the VTR and R-DAT perform reproduction of $\frac{1}{4}$ times speed. Since the AT control is performed in the case of the VTR as mentioned above, tile rotary head tracks four times on the same track. Consequently, the PCM signal in the same frame is repeatedly reproduced four times. There is, as what has been put into practical use, a D-VTR for broadcast application standardized by SMPTE which is called D1 and D2 formats, as an example which is repeatedly reproduced in variable speed reproduction as mentioned above.

In the case of the R-DAT, since the gap width of a reproducing head is wider than the track on the tape, and data which is reproduced by a head of inverse azimuth is made to a signal format which can be interpolated with each other even if one side is of error, tile reproduced sound of the same frame is continuously reproduced by several times.

However, in the digital audio apparatus using the rotary head as mentioned above, reproduced sound of a normal pitch which is punctuated with a periodic time is repeatedly reproduced in variable speed, particularly in low speed reproducing operation. Compared with what the frequency of the reproduced sound varies responding to tape speed like the conventional analog type, there is a problem that search of the head position of a desired program is difficult in editing operation in particularly business use, broadcast use, and operability is very poor. For this reason, in a similar manner in the apparatus mounted with the digital audio, an apparatus which can reproduce a voice signal having high quality at a frequency corresponding to the reproducing speed in tile variable speed reproduction is required with emphasis.

Accordingly, a method which introduces the signal of the same frame which is repeatedly reproduced in the low speed reproducing operation into a memory, and read out at a clock frequency corresponding to the reproduction speed is elucidated in the Japanese laid open patent gazette 61-3368, as a prior art. The reference is designated as Reference 1. In the Reference 1, a basic concept as to the variable speed reproducing method using a memory is shown. However, there was not made clear and concrete presentation as to a method which is applicable to not only the D-VTR but also the R-DAT, and detects renewal of the same frame signal which is repeatedly reproduced, and means which writes surely in the above-mentioned memory only the signal of renewed one frame. Namely, in an apparatus in which the AT control is not performed, and in the event that the number of repetition of the same frame which is reproduced is gradually varied by arbitrary variation of the reproducing speed, it is uncertain whether renewal detection of the frame and writing in the memory are securely performed. Moreover, since the PCM signal read out from the memory is reduced in sampling rate in accordance with the reproducing speed, in the obtained state, quantization noise is generated in an audible frequency band. Therefore, filtering process is applied to an intermittent PCM signal read from the memory, and an interpolating filter is required to return to the original sampling rate. However, there is a problem that the interpolating filter is not referred in the Reference 1, and a high quality reproduced sound can not be obtained in the given condition.

On the other hand, a prior art in which it is intended that a reproduced digital signal is once stored in the memory apparatus of a large capacity, and the stored data Is intermittently read by operating a jog dial, and an effect which is identical with the variable speed reproduction is obtained by interpolating between the read samples is elucidated in the National Technical Report: Vol. 26, No. 6, December 1980, p. 932–p. 934. The document is designated as a reference 2.

The reference 2 shows an interpolating method of a variable speed reproducing apparatus of a digital audio tape recorder using a stationary head for business use. The prior art as to interpolation in the second reference is elucidated hereafter. First, a reproducing speed of PCM voice is varied in accordance with the revolution speed of the dial. Thereby, reproduced interval of the PCM sample varies. If the reproduced interval of the PCM sample is interpolated by "LEVEL HOLDING", waveform distortion significantly increases. Therefore, linear interpolation is performed. Namely, a linear increase is assumed between two samples A, B, and a sample which is newly generated by using a multiplier and an adder interpolates. However, although the above-mentioned method has an advantage that it is realizable by a simple circuit, in case of a low speed reproduction there is a problem that the interpolated waveform is different from the input PCM sample and includes a waveform distortion, and the sound quality is severely damaged, since the input PCM sample is linearly interpolated as described above.

DISCLOSURE OF INVENTION

The present invention aims to provide a variable speed digital signal reproducing apparatus capable of reproducing excellent sound quality by converting a reproduced PCM signal to a frequency (pitch) corresponding to a reproducing speed in variable speed reproducing operation, and reducing waveform distortion as low as possible.

In order to achieve the above-mentioned aim, the variable speed digital signal reproducing apparatus in accordance with the present invention is a digital signal reproducing apparatus wherein tracks are obliquely formed on a tape with a rotary head, and a PCM signal which is constituted with frames divided into every predetermined number and is recorded is reproduced; and it comprises: system control means for outputting tape running speed information in accordance with an operation mode; tape driving means for driving a tape in compliance with the above-mentioned tape running speed information; reproduced signal processing means for demodulating a reproduced signal from the above-mentioned rotary head and for returning to the original PCM signal; memory means for storing the PCM signal demodulated by the above-mentioned reproduced signal processing means; reproduced signal renewal detection means for detecting renewal of the reproduced signal in the variable speed reproducing operation of the tape; memory control means for controlling writing of the above-mentioned PCM signal to the above-mentioned memory means in compliance with a determination result output of the above-mentioned reproduced signal renewal detection means and for controlling readout of the PCM signal from the above-mentioned memory means in compliance with the above-mentioned tape running speed information; and interpolating filter means for interpolating by insertion the PCM signal read from the above-mentioned memory means in accordance with the above-mentioned tape running speed information; whereby in a variable speed reproducing operation it is detected whether the reproduced PCM signal is renewed or not, and the PCM data of one frame is introduced in the memory only when it is renewed, and the PCM data is read at a frequency rate corresponding to the tape reproducing speed at that time, and moreover an interpolation is made for the interval of the readout PCM data by passing it through the interpolation filter in a manner to make an inherent sampling rate, thereby enabling to output by converting to a frequency proportional to the tape reproducing speed.

Moreover, the above-mentioned interpolation filter inputs tile ratio N/M (N, M are positive integers, N = 1, 2, ..., M) of the sampling rate of an input PCM sample to the sampling rate of an output PCM sample; and it forms a partial coefficients group which is made by thinning the number of (M − 1) at a time from a coefficients group of the above-mentioned finite impulse response digital low pass filter wherein the number of tap is K·M which is a product of the number K of tap of the finite impulse response digital low pass filter and the denominator M of the ratio N/M of the above-mentioned sampling rate on the basis of the ratio N/M of the above-mentioned sampling rate; and furthermore recurring of the above-mentioned partial coefficient group is made in the coefficient group of the above-mentioned number K·M of tap, by skipping the number of (N − 1), and the above-mentioned finite impulse response digital low pass filter performs convolutional calculation of the coefficient of tap K which is recurred as mentioned above and the above-mentioned input PCM sample. By mean of this, a higher order interpolation can be performed. Moreover, since the coefficient of the non-recursive digital low pass filter can be made variable by recurring the partial coefficient group every the number of (N − 1) in the coefficient group of the tap number of K·M on the basis of the ratio N/M of the sampling rate, the higher order interpolation can be performed even when the tape reproducing speed varies, namely N varies.

Moreover, by making interruption is applied to every sampling frequency of the output PCM sample having a constant rate, and by rendering that the above-mentioned non-recursive digital low pass filter performs convolutional calculation of the coefficient of the recurred tap K and input PCM sample every the above-mentioned interruption, time control of the convolutional calculation can be performed easily.

BEST MODE FOR CARRYING OUT THE INVENTION

Hereafter, the embodiments of the present invention are elucidated with reference to figures.

Figure 1:
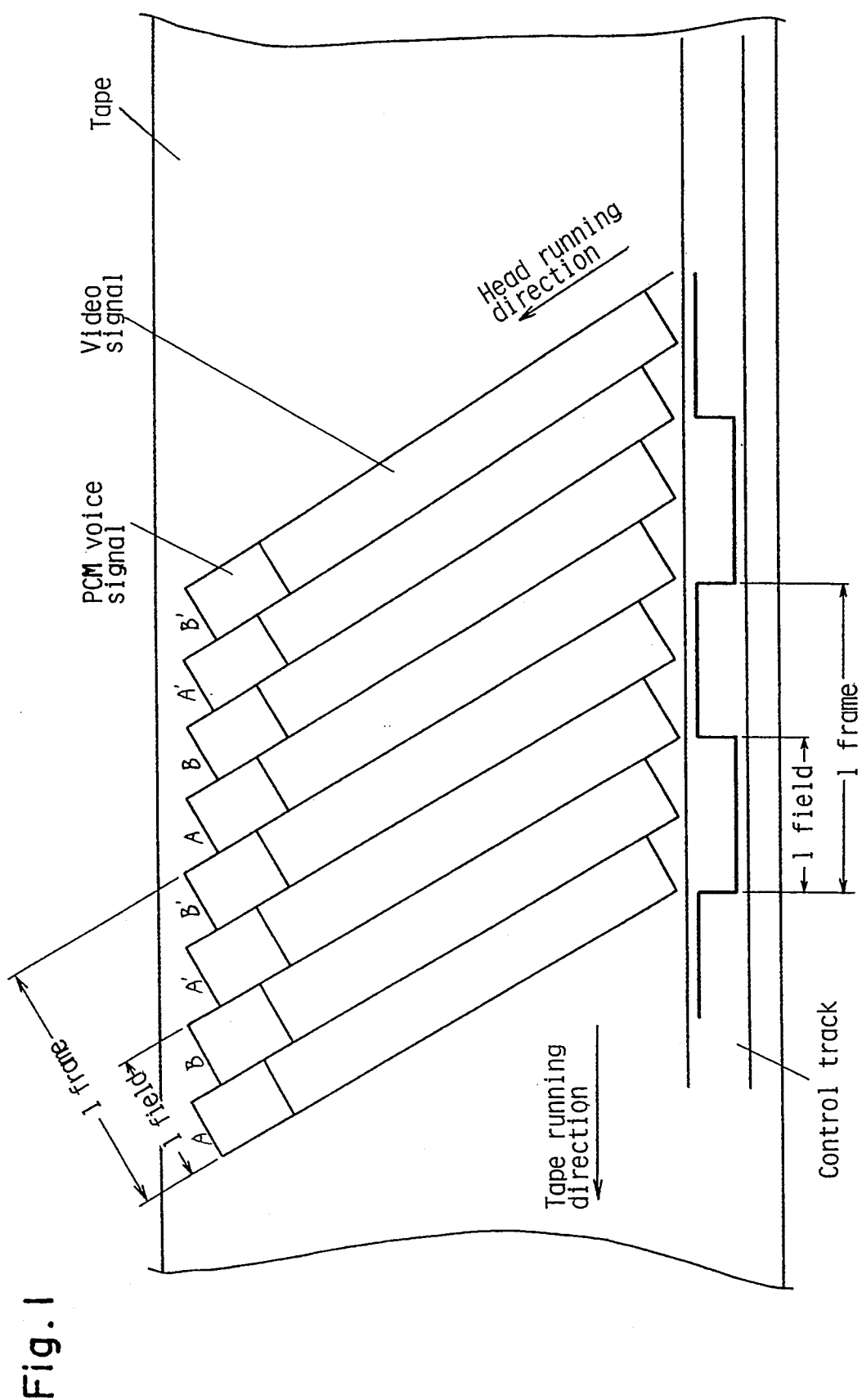
FIG. 1 is a figure showing an example of a format of a digital VTR.

FIG. 1 is a diagram showing an example of a format of a digital VTR. Two pairs of two heads having azimuth angles A, B which are different with each other, number of four in total, are mounted on a cylinder in opposition to each other at 180 degrees, and a video signal of one frame is recorded in tile central part of a tape, and a PCM voice signal is recorded on the upper end part of the tape being divided into four tracks. Moreover, a control track is disposed at the lower end of the tape, and a rectangular wave of one frame cyclic period is recorded or reproduced as a signal for servo by using a stationary head.

Figure 2:
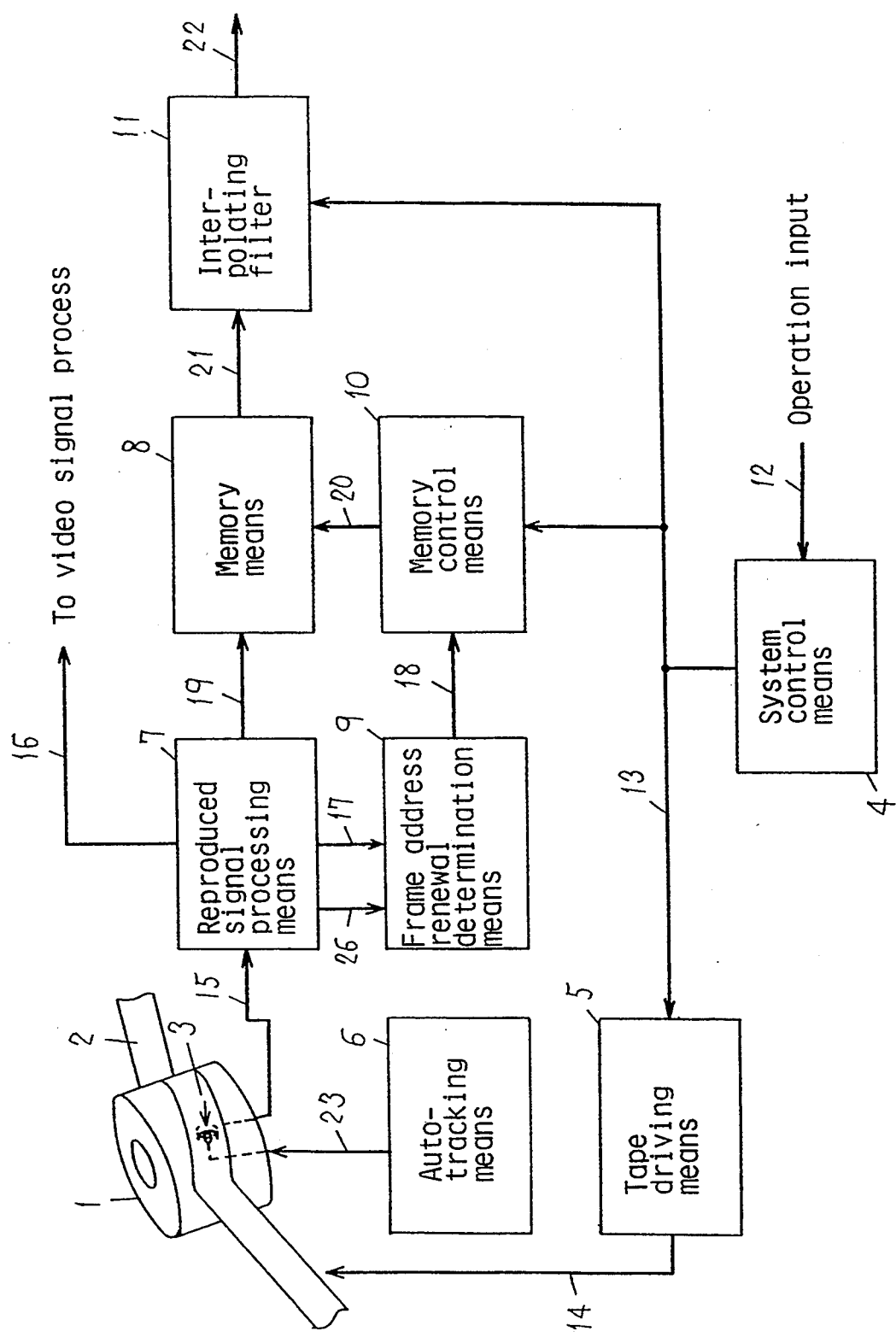
FIG. 2 is a block diagram of a variable speed digital signal reproducing apparatus In a first embodiment of the present invention.

FIG. 2 is a block diagram showing configuration of a variable speed digital signal reproducing apparatus in a first embodiment of the present invention.

Referring to FIG. 2, numeral 1 designates a cylinder, numeral 2 designates a magnetic tape, numeral 3 designates a rotary head, numeral 4 designates system control means, numeral 5 designates tape driving means, numeral 6 designates auto-tracking means, numeral 7 designates reproduction signal processing means, numeral 8 designates memory means, numeral 9 designates frame address renewal determination means, numeral 10 designates memory control means, and numeral 11 designates an interpolation filter.

In the first embodiment, a reproduction signal renewal detection means described in the claim 1 is composed of the auto-tracking means 6 and the frame address renewal determination means 9.

Hereafter, as to the digital signal reproducing apparatus so constituted as mentioned above, the operation is elucidated with reference to FIG. 1 through FIG. 7.

In FIG. 2, a rotary head output 15 reproduced from the rotary head 3 is separated into a video signal 16 and a PCM voice signal 19 and is output after amplification, equalization, detection of a frame synchronizing signal, extraction of frame address, error correction of a PCM signal and deinterleaving processing. The system control means 4 outputs a tape running speed information 13 to the tape driving means 5 which drives the tape in compliance with instructed operation mode of an operation input 12, and the tape driving means 5 transfers the tape by driving a capstan and the like by the tape driving output 14.

On the other hand, in the VTR for broadcast use, an image signal of one frame is recorded into plural tracks by division, in most cases. Therefore, even in the case that the variable speed special reproduction is operated, a normal image can not be reproduced, unless a set of tracks wherein an image signal for one frame is recorded, all the tracks of A, B, A', B' in FIG. 1 in the present example, are reproduced. For this reason, the AT control is generally used as the known art as mentioned above. Numeral 6 in FIG. 2 is designates the auto-tracking means, and numeral 23 designates auto-tracking control output. In the auto-tracking means 6 in the example, a target track position is assumed based on the control signal recorded in the control track for capstan servo which is formed in the lengthwise direction of the tape and the FG signal from the capstan, and tracking control is performed by controlling a head height on the basis of the output level of the reproduced signal from the rotary head.

In variable speed reproduction, the rotary head output 15 from the rotary head 3 is output to the memory means 8 as the PCM voice signal 19 in the reproduction signal processing means 7. Moreover, the reproduction signal processing means 7 outputs a clock signal frame clock 26 of a frame frequency which is separated and extracted from the frame synchronizing signal, and moreover a frame address which is attached to each frame is separated and extracted, and is output to the frame address renewal determination means 9 as a frame address output 17.

Figure 3:
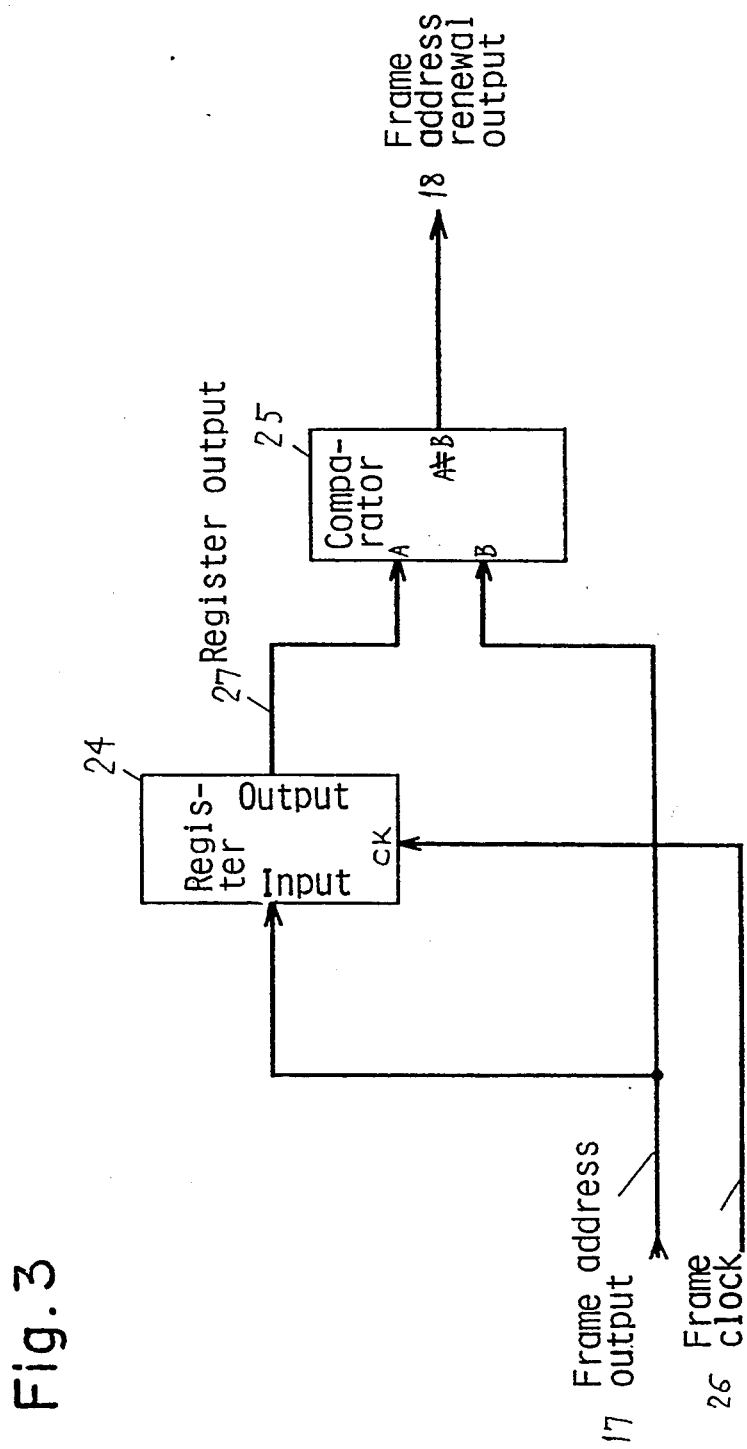
FIG. 3 is a block diagram showing configuration of a frame address renewal determination means in the same embodiment.
Figure 4:
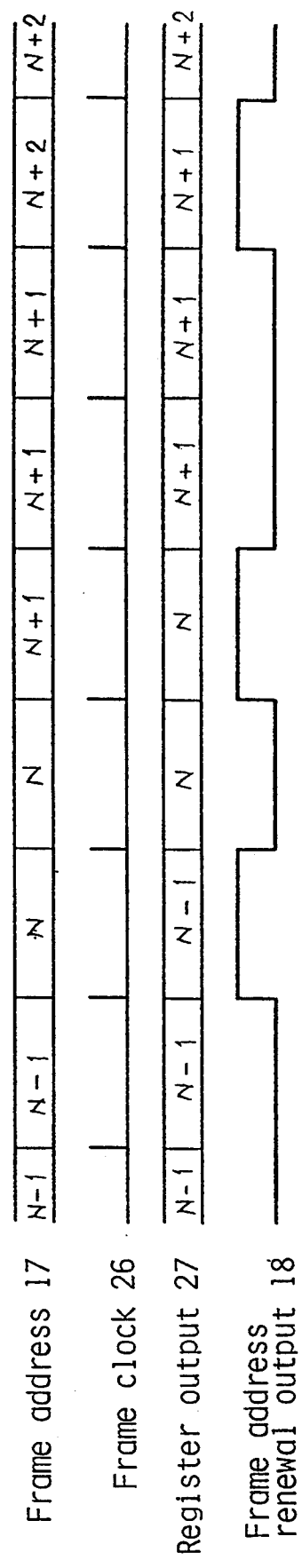
FIG. 4 is a waveform diagram showing operation of the frame address renewal determination means in the same embodiment.

FIG. 3 shows an example of configuration of the frame address renewal determination means 9 and FIG. 4 shows the time chart thereof. In the frame address renewal determination means 9, the value of the frame address output 17, which has been reproduced one frame ago, is delayed by one frame by memorizing in the register 24 by the frame clock 26; and the value of the frame address output 17 reproduced newly is compared with the register output 27 in a comparator 25, and "H" level is output to the memory control means 10 as a frame address renewal output 18 only at noncoincidence.

In FIG. 2, in the memory control means 10, a write controlling of the PCM voice signal 19 to the memory means 8 is performed only when the frame address is renewed in compliance with the frame address renewal output 18 by the memory control output 20. Read operation is performed with a clock of a frequency corresponding to the tape running speed information 13 which is given from the system control means 4. Namely, if the running speed is ¼ of normal running, the frequency of a readout clock of the PCM signal from the memory means 8 is reduced to ¼ of the normal sampling frequency.

Figure 5:
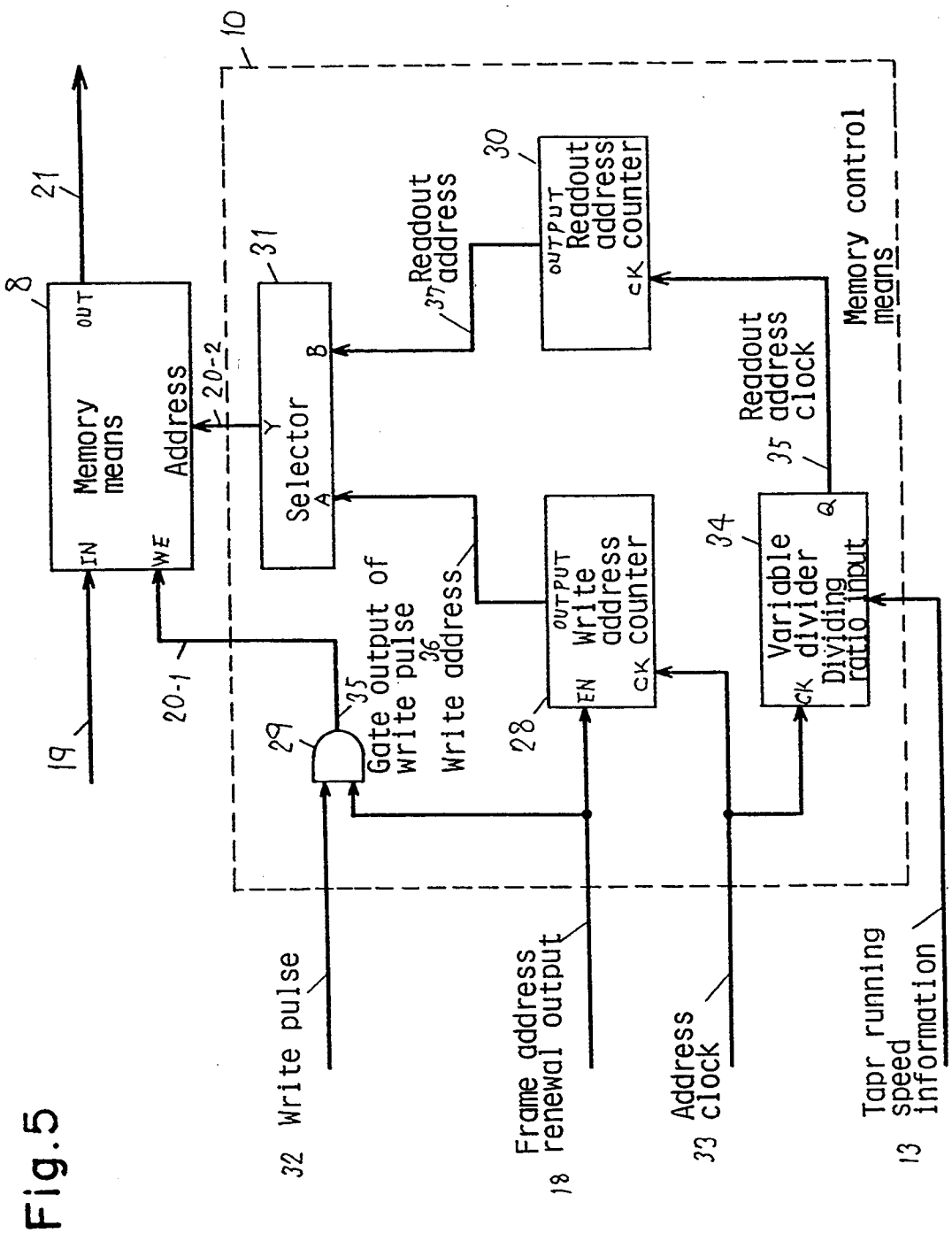
FIG. 5 is a block diagram showing configuration of memory means and memory control means in the same embodiment.
Figure 6:
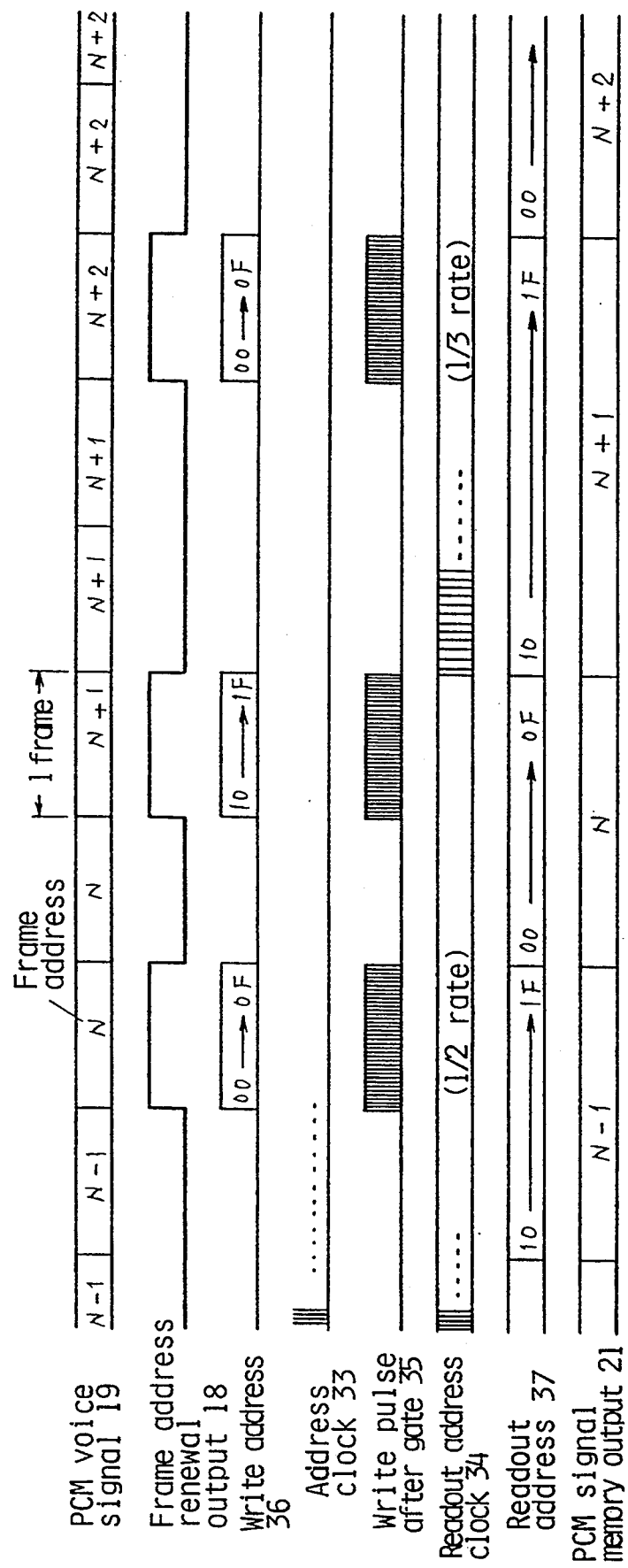
FIG. 6 is a waveform diagram showing operation of the memory means and memory control means in the same embodiment.

Examples of configurations of the memory means 8 and memory control means 10 are shown in FIG. 5, and the time chart thereof is shown in FIG. 6. In FIG. 5, numeral 8 designates the memory means, the part 10 surrounded by a dotted line is the memory control means. Numeral 28 designates a write address counter, numeral 29 designates a gate, numeral 30 designates read counter, numeral 31 designates a selector, and numeral 34 designates a variable divider. Write pulse 32 and address clock 33 are clock pulses of a constant rate supplied from a clock generating means, which is not shown. When the frame address renewal output 18 which is output from the frame address renewal determination means 9 is of "H" level, namely in the event that the PCM voice signal 19 is renewed, a write pulse 20-1 is output to the write control terminal WE of the memory means 8 through a gate 29; and the count control terminal EN of the write address counter 28 turns to enable status and address clock 33 which is supplied is counted, and a write address 36 of one frame is generated.

On the other hand, in the variable divider 34 in a similar manner, the address clock 33 is divided in compliance with the tape running speed information 13 which is given by the system control means 4, and is supplied to the read address counter 30 as a read address clock 35. In the selector 31, write address 36 and the read address 37 are selected at a predetermined timing and is supplied to the memory means 8 as an address 20-2. The memory means 8 is preferably has a memory capacity for at least two pages, where the PCM data for one frame is one page, for example. Namely, during the while one page is used for writing, the other page is used for reading.

In FIG. 6, the addresses of two pages which are used for writing and for reading in the memory means are designated by 00-0F, 10-1F in HEX (hexadecimal) representation. The write address 36 writes the PCM voice signal 19 of a frame address value N into the addresses 00-0F in accordance with the frame address renewing output 18, and subsequently writes the PCM voice signal 19 of renewed frame address value N+1 into the addresses 10-1F. As mentioned above the writing is alternately and intermittently performed in both the pages. Moreover, in the readout in the example, the address clock 33 is divided into ½ or ⅓ in the variable divider 34 in compliance with the tape running speed information 13 output from the system control means 4 and readout address 37 is continuously generated, and the PCM signal memory output 21 is read from the memory means 8.

Referring to FIG. 2, since the PCM signal memory output 21 which is read from tile memory means 8 is reduced to ½ or ⅓ of normal reproduction in the sampling frequency In the present state, quantization noise is generated in an audible frequency range if returned to the analog signal; and S/N of reproduced sound is deteriorated. Accordingly, it is returned to the normal sampling frequency by inserting an interpolating sample, which is calculated by a predetermined coefficient in accordance with the tape running speed information 13 on the basis of the sample values therebefore and thereafter, between the original PCM signals by using the interpolating filter 11; and a PCM signal interpolating filter output 22 which is a final output is obtained. Configuration of the interpolating filter 11 is elucidated in detail in description of claim 5.

Figure 7:
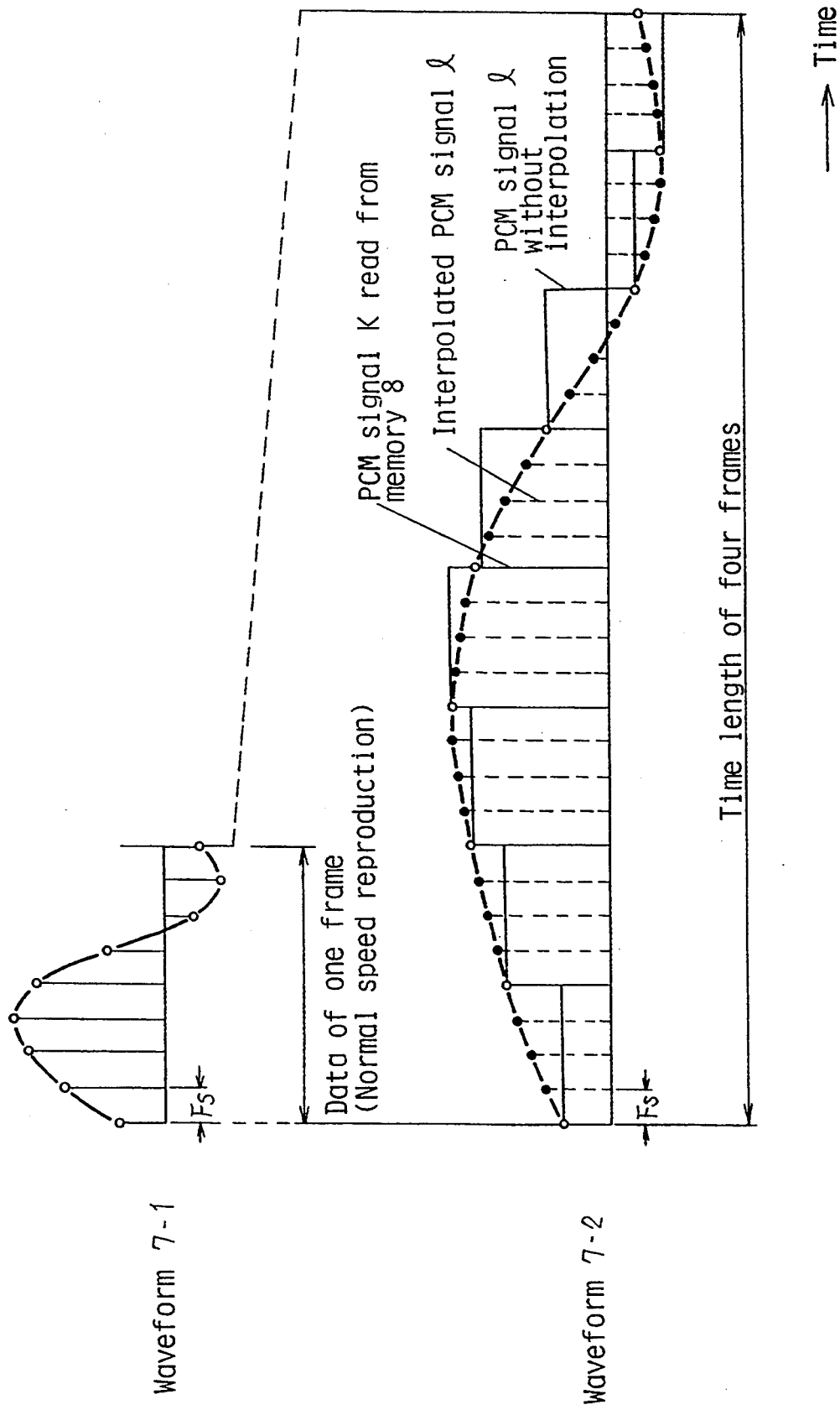
FIG. 7 is a waveform diagram showing interpolation operation of a interpolation filter in the same embodiment.

In FIG. 7, a waveform 7-1 is a PCM signal output waveform of one frame in case the reproduction is made in the normal reproduction speed; a waveform 7-2 is a PCM signal output waveform which is interpolated in ¼ speed reproduction. As shown in the figure, the frequency in the case, wherein the PCM signal interpolating filter output 22 which is reproduced is finally converted into an analog signal, is reduced to ¼ of the ordinary one. In the event that the interpolating process is not performed the output waveform becomes stepwise and favorable reproduced sound can not be obtained.

According to the present embodiment as has been mentioned above, in variable speed reproduction case, whether the frame address is renewed or not is detected, and the PCM data for one frame is introduced in the memory only in case of renewal, and the PCM data is read at the frequency rate corresponding to the tape reproduction speed at that time; and moreover the interval of read PCM data is interpolated by passing the interpolation filter so as to become the original sampling rate, and it can be output by converting into a frequency proportional to the tape reproducing speed.

Subsequently, the variable speed digital signal reproducing apparatus of a second embodiment of the present invention is elucidated with reference to figures.

Figure 8:
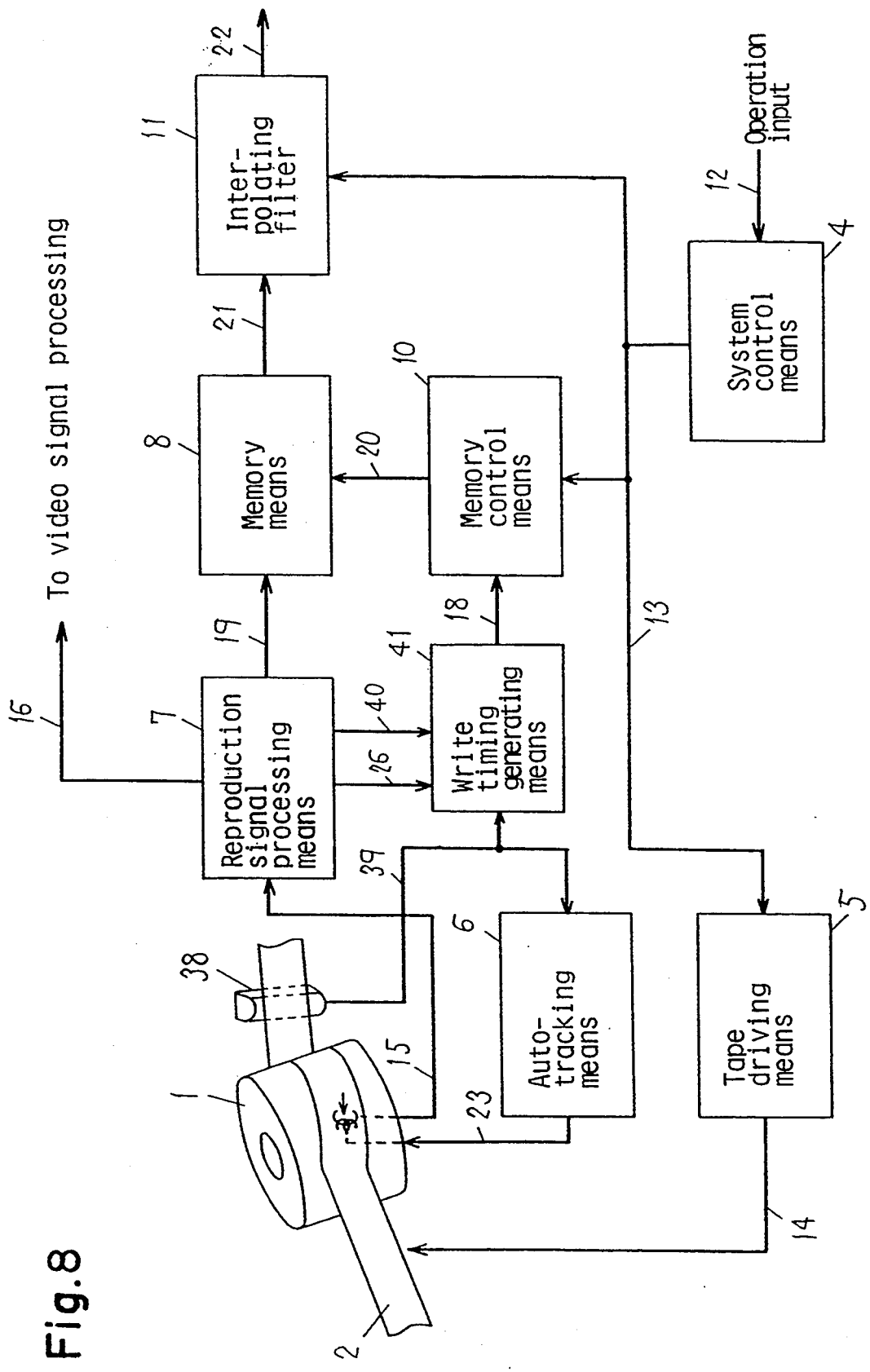
FIG. 8 is a block diagram showing configuration of write timing generating means in a second embodiment.

FIG. 8 shows a block diagram of a variable speed digital signal reproducing apparatus in the second embodiment of the present invention.

Referring to FIG. 8, since numerals 1-23 designate the same structural elements as the first embodiment shown in FIG. 2, the elucidation therefor is omitted. Numeral 38 designates a stationary head for reproducing the control track, and numeral 41 designates write timing generating means.

In the second embodiment, the reproduction signal renewal detecting means described in claim 1 is composed of the auto-tracking means 6 and a writing timing generating means 41.

In connection with the variable speed digital signal reproducing apparatus composed as mentioned above, hereafter, the operation thereof is elucidated by using FIG. 8 through FIG. 11.

In FIG. 8, a control signal reproduction output 39 reproduced from the stationary head 38 is inputted to the write timing generating means 41. In the write timing generating means 41, a frame address renewal output 18 is generated by using the control signal reproduction output 39 and the frame clock 26 which is separated and extracted from the rotary head output 15 by the reproduction signal processing means 7. Namely the PCM voice signal 19 of one frame which is firstly reproduced after rise from "L" to "H" of the control signal reproduction output 39 is written in the memory means 8.

Figure 9:
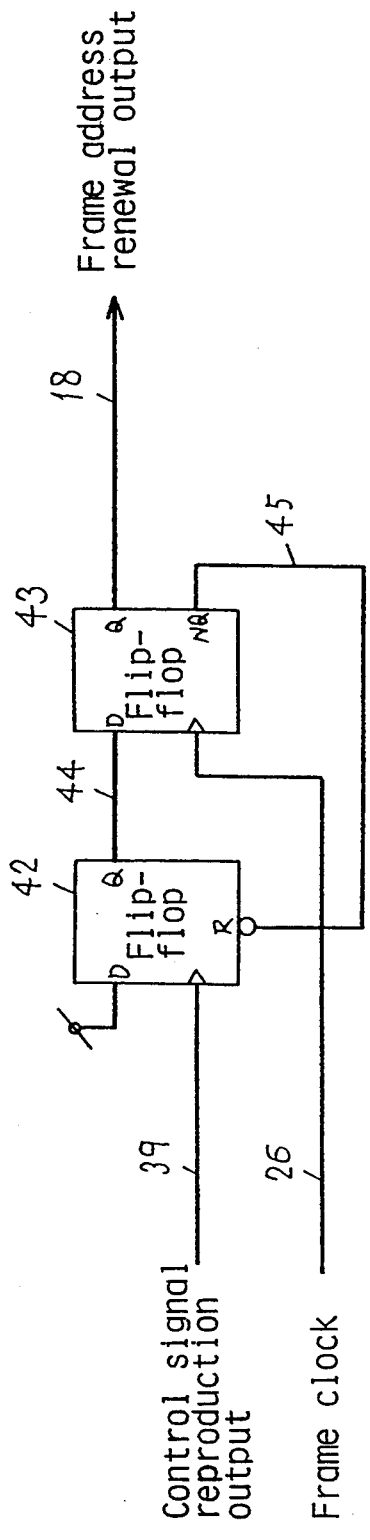
FIG. 9 is a block diagram showing configuration of write timing generating means in tile same embodiment.
Figure 10:
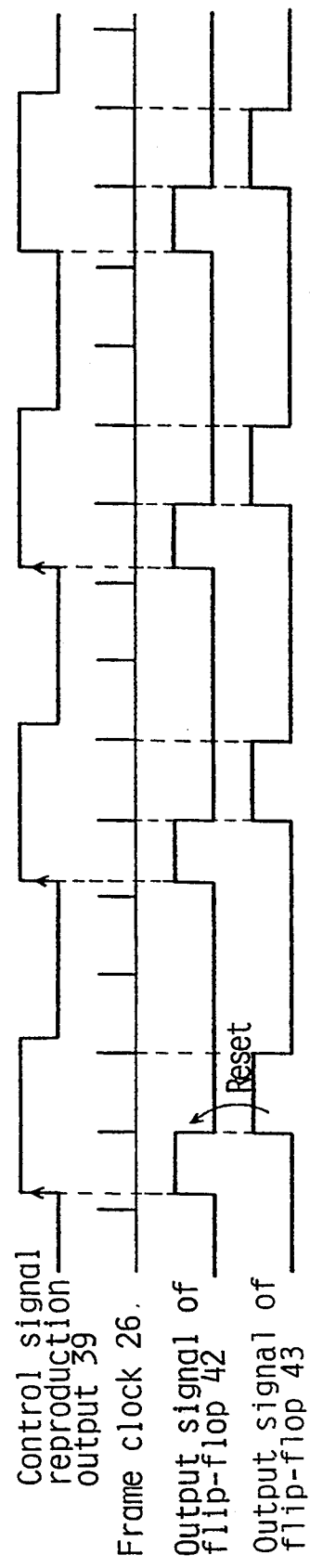
FIG. 10 is a waveform diagram showing operation of the write timing generating means in the same embodiment.

An example of configuration of the write timing generating means 41 is shown in FIG. 9, and a time chart showing the operation is shown in FIG. 10. Referring to FIG. 9, numerals 42, 43 designate D-type flip-flops. The flip-flop 42 is set by the rise edge of the control signal reproduction output 39, and is reset by an invert output NQ of the flip-flop 43. The flip-flop 43 reads the output Q of the flip-flop 42 using the frame clock 26 as a clock. Consequently, the output Q of the flip-flop 43 holds "H" level only between first arrival of the frame clock 26 and second arrival of the frame clock after rise of the control signal reproduction output 39, and this becomes the frame address renewal output 18.

Figure 11:
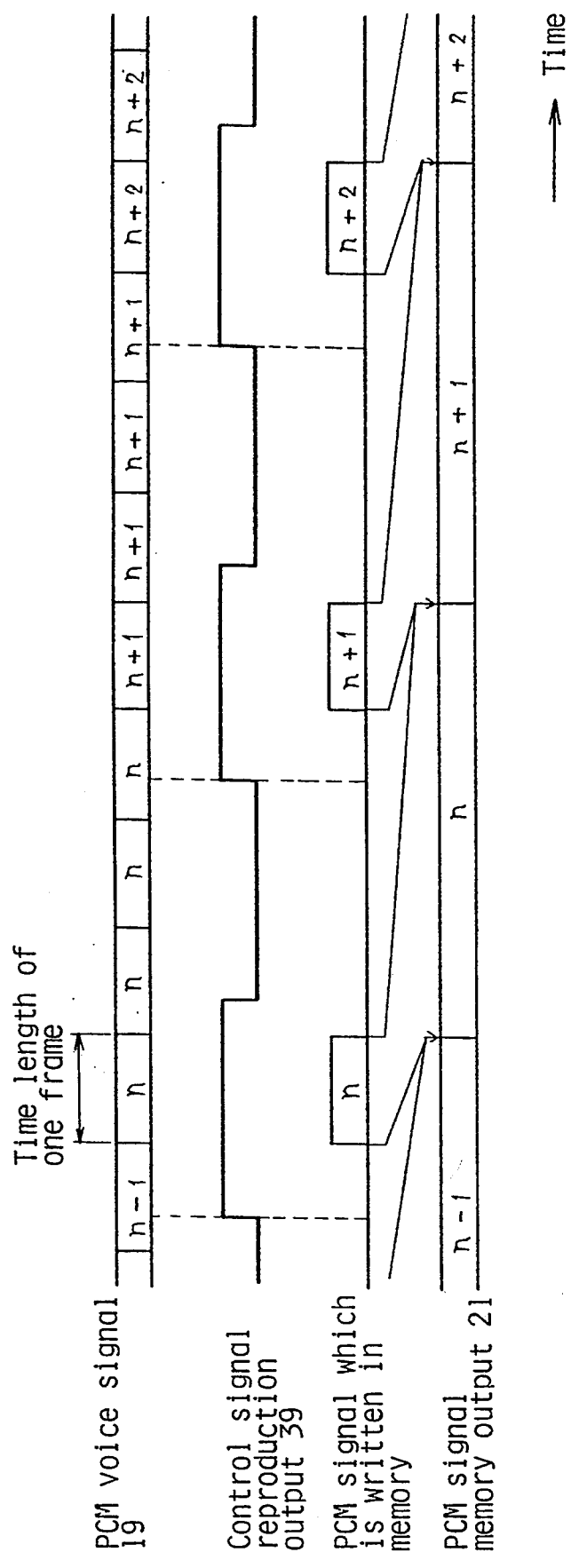
FIG. 11 is a waveform diagram showing operation of the memory means and memory control means in the same embodiment.

FIG. 11 is a figure representing in the embodiment relations of the PCM voice signal 19 reproduced from the reproduction signal processing means 7, the control signal reproduction output 39 reproduced from the stationary head 38 and the PCM signal which is written in the memory means 8 and the PCM signal memory output 21 which is read at the clock rate of ¼ times.

Since the control signal reproduction output 39 is recorded on a linear track along the lengthwise direction of the tape in synchronism with the frame, the PCM voice signal 19 of one frame is written in the memory means 8 every renewal of the frame. The operations of other memory control means 10, memory means 8 and interpolating filter 11 are identical with those of the first embodiment and are omitted.

According to the present embodiment as mentioned above, even in case that the frame address can not be attached, or renewal can not be detected, the control signal reproduction output is detected in the variable speed reproduction, and the PCM voice signal of one frame which is reproduced by the rotary head by one times per one frame of the control signal is introduced in the memory, and the PCM voice signal is read at the frequency rate corresponding to the tape reproducing speed at that time, and further, the interval of the PCM voice signals which are read is interpolated by passing the interpolating filter, so as to become the intrinsic sampling rate, and thereby, It can be converted into the frequency in proportional to the tape reproducing speed and be output.

Subsequently, the variable speed digital signal reproducing apparatus of a third embodiment of the present invention is elucidated with reference to figures.

Figure 12:
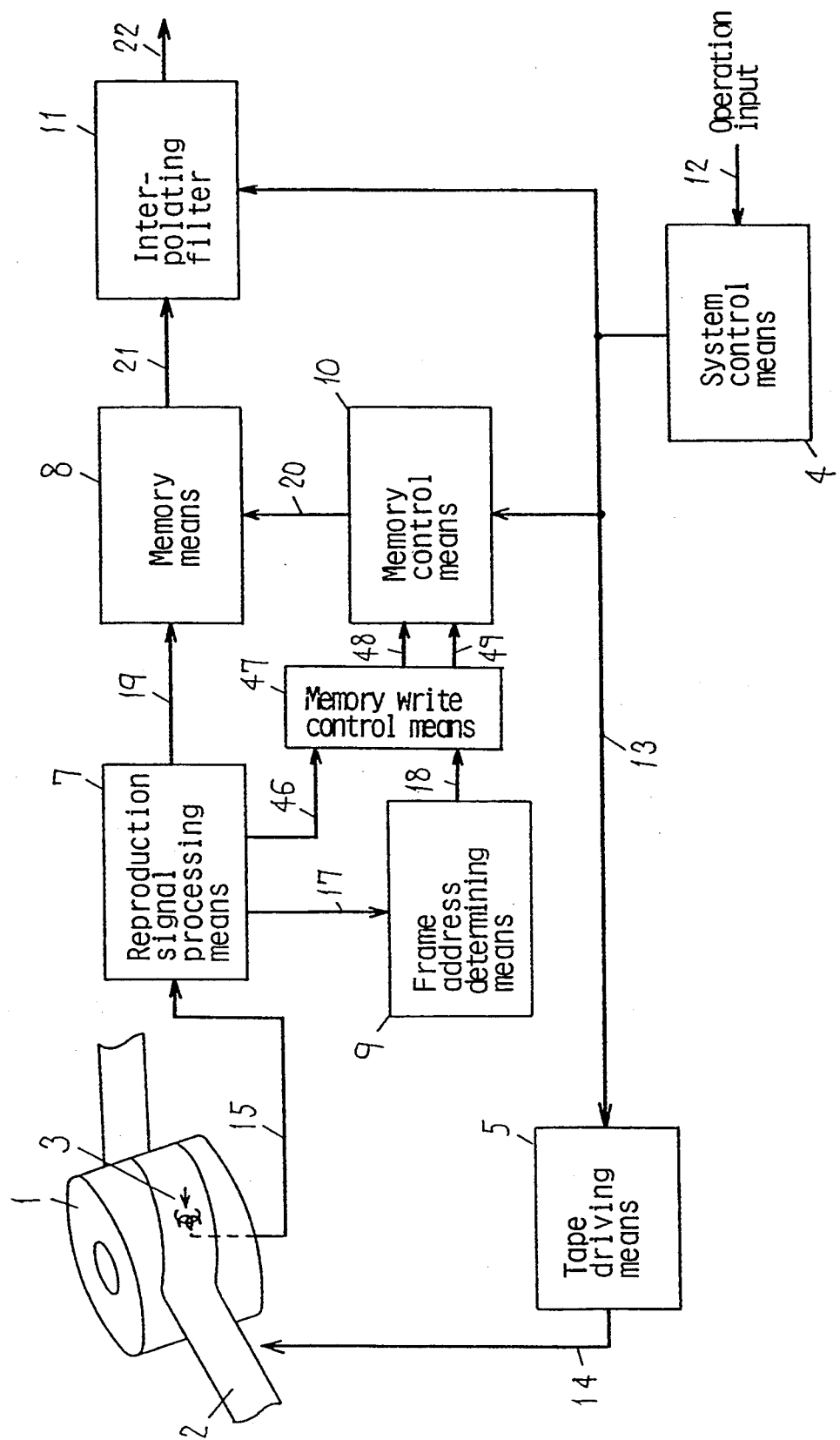
FIG. 12 is a block diagram of the variable speed digital signal reproducing apparatus in a third embodiment of the present invention.

FIG. 12 shows a block diagram of the variable speed digital signal reproducing apparatus in the third embodiment of the present invention.

Referring to FIG. 12, since numerals 1-22 designate the same structural elements as the first embodiment shown in FIG. 2, the elucidation is omitted. Numeral 46 designates error correction result with respect to the PCM signal which is performed in the reproduction signal processing means 7, numeral 47 designates memory write control means.

In the third embodiment, the reproduction signal renewal detecting means described in claim 1 is comprised of the frame address renewal determination means 9 and the memory write control means 47.

In connection with the variable speed digital signal reproducing apparatus configured as mentioned above, hereafter, the operation is elucidated by using FIG. 12 through FIG. 15. In the present embodiment, since AT control is not performed, as shown in the example of the R-DAT of FIG. 16, the PCM signal which is different in error condition is repeatedly reproduced at the frame periodic time in the variable speed reproduction.

In FIG. 12, in the reproduction signal processing means 7 error correction operation of the PCM signal in a unit of frame is performed by using an error correction code which is attached in advance. Usually the error correction is performed in units of sub-frame for which the PCM signal of one frame is further subdivided. Then, reliability of the entire frame can be determined by comparing the number of error generation in units of the sub-frame in one frame with the predetermined value. In the case of the R-DAT for example, one frame is composed of A, B heads, but when one head traces on the track of inverse azimuth in the variable speed reproduction, the most part of the sub-frames of at least the frame becomes error. Therefore, a counter for counting the number of error of the sub-frame is provided in the reproduction signal processing means 7; and when the number of error of the sub-frame of the frame is less than ½ of the number of entire sub-frames, namely the error correction result 46 which becomes "H" when it is assumed that both the heads A, B have traced on a predetermined track is output from the reproduction signal processing means 7. In the memory write control means 47, a page address 48 and an address enable 49 in the page are generated and output to the memory control means 10, in compliance with the error correction result 46 and the frame address renewal output 18. In the memory control means 10, write page address 48 which is given from the memory write control means 47 is used as a write page address in the same state; and the write address of one frame is repeatedly generated during "H" of the address enable 49 in the page and write of the PCM voice signal 19 is performed in the memory means 8.

Figure 13:
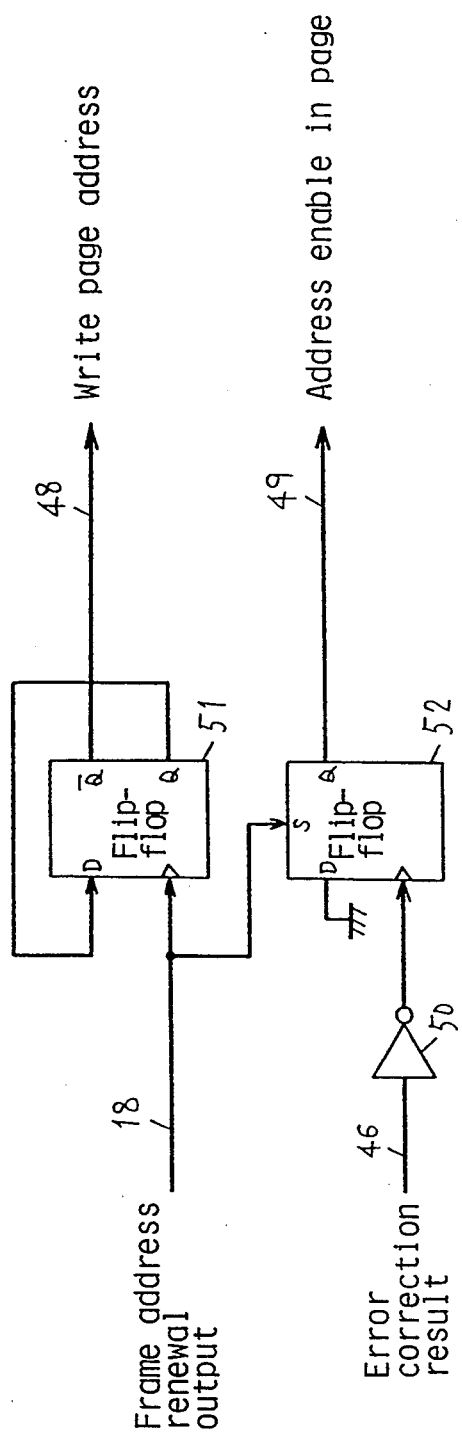
FIG. 13 is a block diagram showing configuration of the memory write control means in the same embodiment.
Figure 14:
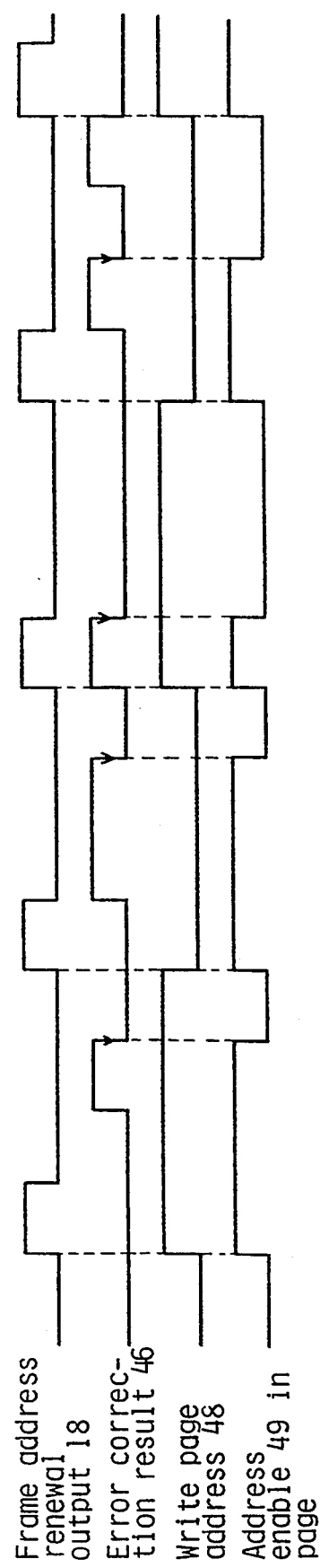
FIG. 14 is a waveform diagram showing operation of the memory write control means in the same embodiment.

An example of configuration of the memory write control means 47 is shown in FIG. 13, and a time chart showing tile operation thereof is shown in FIG. 14. Referring to FIG. 13, numeral 50 designates an inverter, numerals 51, 52 designate D-type flip-flops. The flip-flop 51 divides the frame address renewal output 18 to ½ and output to the memory control means 10 as the write page address 48. Moreover the error correction result 46 is inverted by an inverter 50 in logic, and is inputted to the clock terminal of the flip-flop 52. The flip-flop 52 is set by the frame address renewal output 18 and is reset by fall edge of the error correction result 46. A Q-output of the flip-flop 52 is output to the memory control means 10 as the address enable 49 in the page. Consequently, the PCM signal during the rise from "L" to "H" of the frame address renewal output 18 and the first fall down of the error correction result 46 is repeatedly written in the same page of the memory means 8.

Figure 15:
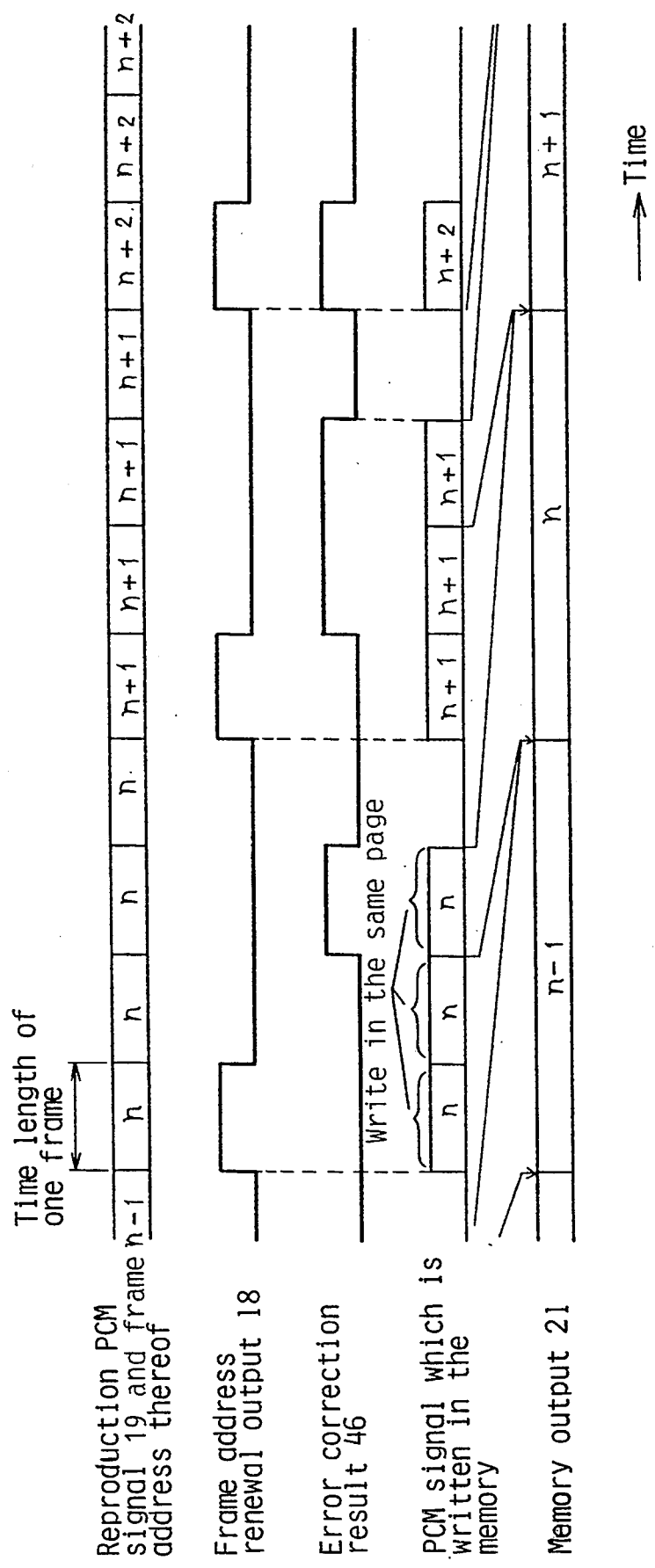
FIG. 15 is a waveform diagram showing operation of the memory means and memory control means in the same embodiment.
Figure 16:
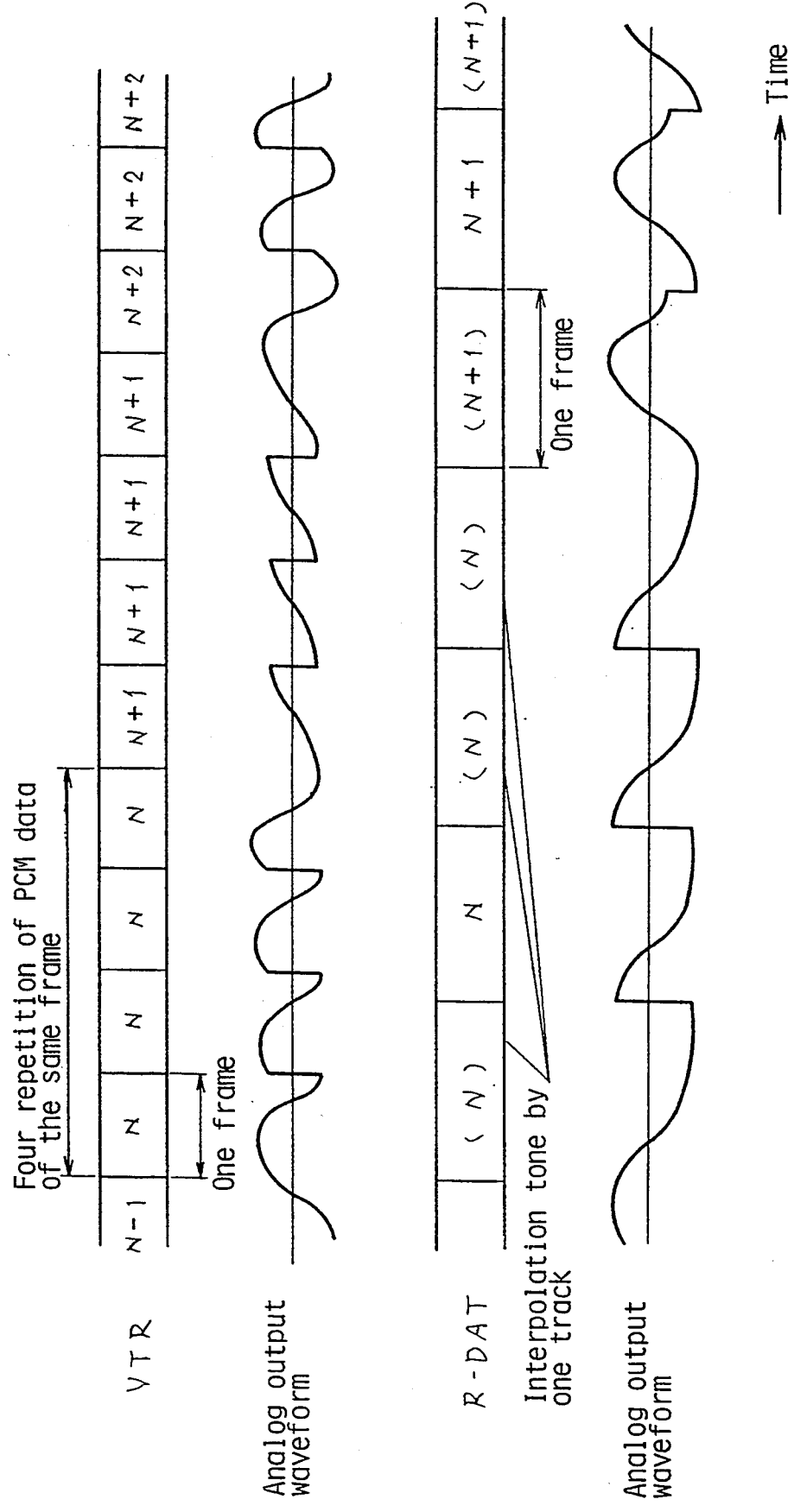
FIG. 16 is a waveform diagram showing PCM signal outputs in ¼ rate speed reproduction in the conventional VTR and DAT.

FIG. 15 is a waveform diagram in the present embodiment representing relations of the PCM voice signal 19 reproduced from the reproduction signal processing means 7 with tile frame address output 17 thereof, the frame address renewal output 18, the error correction result 46 in unit of frame output from the reproduction signal processing means 7 and the PCM signal which is written in the memory means 8 and tile PCM signal memory output 21 which is read.

However, in the case of the present embodiment, the case in which the correct PCM signal is not always reproduced before renewal of the frame address is thought. Therefore, after renewal of the frame address, by writing repeatedly the data of the same frame into the same page until the error correction result 46 becomes "H", even if the frame address is renewed without becoming "H" in the error correction result 46, the PCM data of the one frame remains on the memory means 8. In the above-mentioned case, the PCM signal which is finally reproduced of the frame remains in the memory means 8.

The operation after readout from the memory means 8 is identical with that of the first and second embodiments and is omitted.

According to the present embodiment, as mentioned above, even In case that auto-tracking is not performed by the above-mentioned configuration, it is detected whether the frame address is renewed or not in the variable speed reproduction, moreover by monitoring the error correction result, the PCM data of the frame which has renewed frame address and is correctly reproduced is stored in the memory; and the PCM data is read at the frequency rate corresponding to the tape reproducing speed at that time; and moreover the interval of the PCM data which is read is interpolated by passing the interpolating filter so as to become the original sampling rate, and thereby it can be converted into the frequency in proportional to the tape reproducing speed and be output.

In the first and second embodiments, renewal of the frame address in the PCM voice signal 19 output from the reproduction signal processing means 7, or the condition of renewal of the control signal is determined, control is performed by the memory control means 10 so that the PCM signal is written in the memory means 8 only when it is required; but it is not always required to inhibit write, and a configuration may be made such that the same data can be repeatedly written in the same address of the memory, and only renewal of the write page is controlled by the above-mentioned condition.

Moreover, in the above-mentioned three embodiments, the tape running speed information is constituted so that the system control means directly output in compliance with the operational input, but it may be constituted so as to use the means by which the tape running speed information is detected by a periodic time or the like of an FG signal of the capstan and is output, for example.

Furthermore, in the above-mentioned three embodiments, by reversing readout address of the sample of the PCM signal from the memory with respect to write in units of the frame, better reverse reproduction sound can be easily obtained in low speed reproduction in reverse direction.

As mentioned above in the present invention, whether the frame address is renewed or not is detected in variable speed reproduction and only when renewal is performed the PCM data of one frame is stored in the memory, the PCM data is read at the frequency rate corresponding to the tape reproducing speed at that time; moreover the interval of the PCM data which is read is interpolated so as to become the original sampling rate by passing the interpolating filter, and is converted into the frequency in proportional to the tape reproducing speed and can be output, the PCM voice signal can be reproduced with operational feeling which is similar to the conventional analog apparatus, and particularly head search operation in editorial operation can be rapidly performed.

Moreover, even in case that the frame address can not be attached, or renewal can not be detected, in variable speed special reproduction, the control signal is detected, and the PCM data of one frame which is reproduced from the rotary head only one time in one frame of the control signal is introduced in the memory, and the PCM data is read at the frequency rate corresponding to the tape reproducing speed at that time, and moreover the interval of the reproduced PCM data is interpolated by passing the interpolating filter so as to become the original sampling rate, and it is converted to a frequency in proportional to the tape reproducing speed and is output, and a similar effect is obtainable.

Moreover, in case that auto-tracking is not performed, in variable speed special reproduction, whether the frame address is renewed or not is detected, furthermore the frame address is renewed by monitoring error correction result, moreover, the PCM data of correctly reproduced frame is introduced in the memory, the PCM data is read at the rate corresponding to tape reproducing speed at that time, moreover the interval of the reproduced PCM data is interpolated by passing the interpolating filter so as to become the original sampling rate, and by converting to the frequency in proportional to the tape reproducing speed and is output, a similar effect is obtainable.

Subsequently, configuration of the interpolating filter which is used in claim 1 through claim 4 is elucidated by using a fourth, fifth embodiments.

Figure 17:
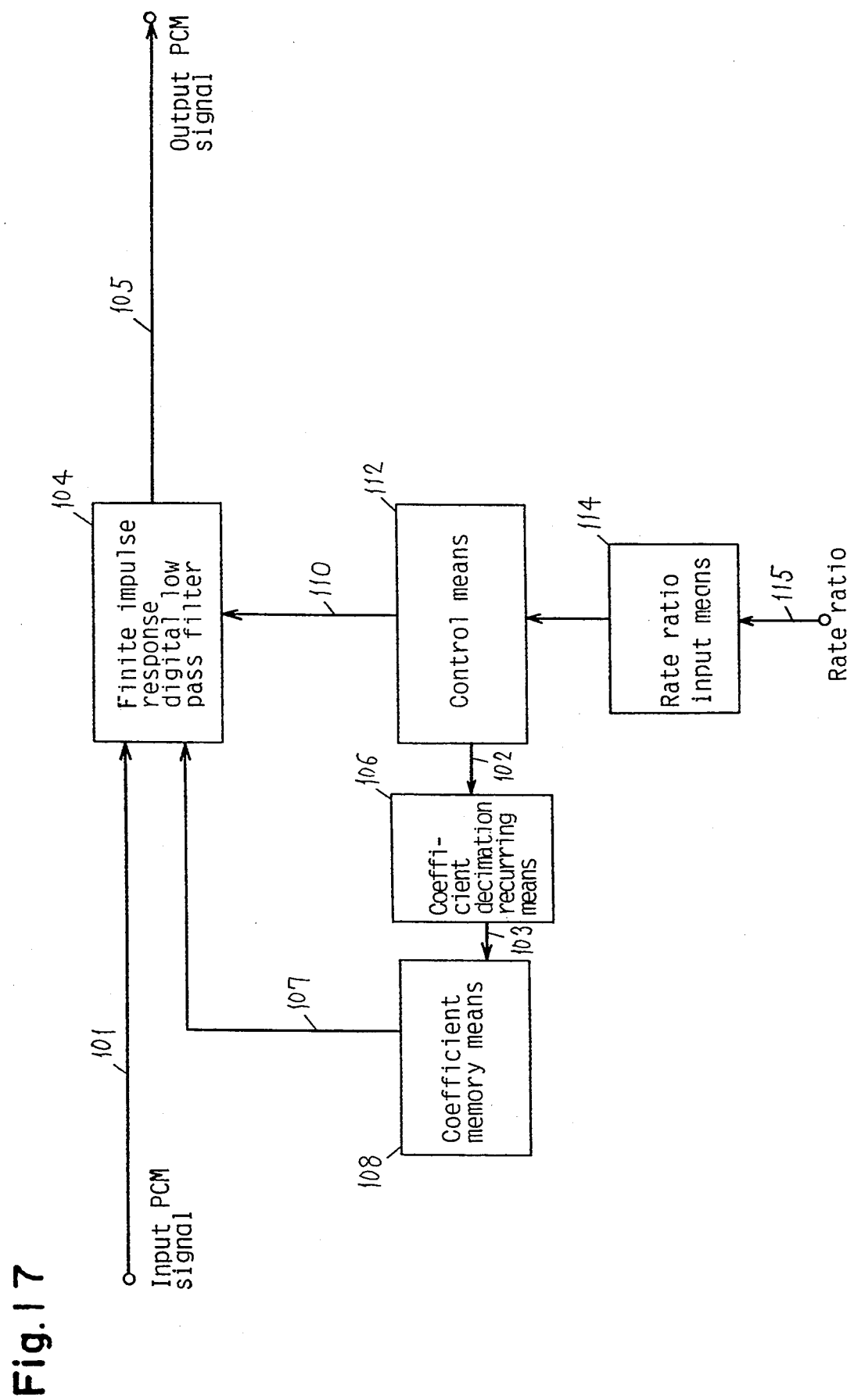
FIG. 17 is a block diagram showing configuration of a variable speed reproducing apparatus in a fourth embodiment of the present invention.

FIG. 17 is a block diagram showing configuration of the interpolating filter in the fourth embodiment of the present invention.

In FIG. 17, an input PCM signal 101 is applied to a finite impulse response digital low pass filter (convolution calculating means) 104; at this place the convolution calculation is performed with the coefficient 107 of the finite impulse response digital low pass filter 104; and an output signal 105 is obtained. The ratio of the sampling rate of tile input PCM signal which is applied from the outside to the sampling rate of tile output PCM signal is represented by N/M. However, because of low speed reproduction, N=1, 2, ..., M, it is provided that the output sampling rate is higher than the input sampling rate. Now, as an example, the case of 3/15 times of speed is elucidated. In this case, rate ratio 15 (N/M=3/15) is applied to a control means 112 via a rate ratio input means 114. In order that tile finite impulse response digital low pass filter 104 performs interpolating function by constituting a low pass filter, a coefficient 107 of the finite impulse response digital low pass filter 104 is required. The coefficient 107 which is used for this purpose is generated as described hereafter. The coefficient 107 is memorized in a coefficient memory means 108. The coefficient memory means 108 is composed of a read only memory (hereinafter is referred to as ROM), for example. The control means 112 sends the coefficient selection signal 102 to a coefficient decimation recursive means 106 on the basis of the rate ratio 115; and the coefficient decimation recursive means 106 sends an address signal 108 designating a coefficient for selecting to the coefficient memory means 108. The coefficient memory means 108 sends coefficient 107 to the finite impulse response digital low pass filter 104. The finite impulse response digital low pass filter 104 performs convolution calculation by order from tile control means 112.

When tile input PCM sample is represented by X(k) (k=0-kmax), and coefficient is represented by H(k) (k=0-kmax), the output Y(i) is represented by the convolution calculation shown by the following equation.

$$Y(i) = H(k) \cdot X(k) \tag{2}$$

The equation (2) is accomplished by the finite impulse response digital low pass filter 104. Where, the finite impulse response digital low pass filter 104 comprises a memory means which memorize the input PCM sample in order to accomplish continuously the normal equation (2) with respect to k=0-kmax. Namely, the finite impulse response digital filter 104 accomplishes the equation (2) by using the input sample X(k) (k=0-kmax) on the finite impulse response digital filter and the coefficient H(k) (k=0-kmax) on the coefficient memory means 108.

Hereafter, the number of tap of the finite impulse response digital low pass filter 104 is considered. In general, a signal to noise ratio (hereinafter is referred to as S/N) after passing the digital filter depends on the number of tap. For example, provided that S/N is 60 dB, requirement of several ten taps is known by simulation. In this case, the number of tap is 60.

Now, the number of tap is considered in the case which configurates the interpolating filter. When the minimum reproducing speed is 1/15 times speed, fourteen interpolating samples must be generated from one input PCM sample. Therefore, as the number of the coefficient, 60 taps × 15 = 900 taps are necessary. Namely, the coefficient of the finite impulse response digital low pass filter of 900 taps is necessary. This coefficient table is shown in Table 1.

Referring to the Table 1, H(0)-H(899) are coefficients of the finite impulse response digital low pass filter of the above-mentioned 900 taps.

In the Table 1, the vertical direction represents the number of face of the table, in this case there is 15 faces of i=0-14. The horizontal direction represents the number of tap of the finite impulse response digital low pass filter 104, and in this case there is 60 taps of 0-59. Moreover, H(0)-H(899) represent respective coefficients. A partial coefficient group which is used in each multiple speed is obtained by thinning M−1=14 from the coefficient group of H(0) H(899).

TABLE 1

| Coefficient of 15 faces | Order of tap | | |
|---|---|---|---|
| | 0 | 1   - - -   | 59 |
| i = 0 | H(0) | H(15) | H(885) |
| i = 1 | H(1) | H(16) | H(886) |
| i = 2 | H(2) | H(17) | H(887) |
| i = 3 | H(3) | H(18) | H(888) |
| . | | | |
| . | | | |
| . | | | |
| i = 14 | H(14) | H(29) | H(899) |

Namely, they are H(0), H(15), . . . H, (885) or the like. Moreover, since tills case is 3/15 multiple speed, the entire of the partial coefficients group are obtained by recurring the partial coefficients group in the coefficients group of H(0)-H(899) by skipping N−1=2, five pairs are:

A: H(0), H(15), . . . , H(885)
B: H(3), H(18), . . . , H(888)
c: H(6), H(21), . . . , H(891)
D: H(9), H(24), . . . , H(894)
E: H(12), H(27), . . . , H(897).

In the equation (2), respective coefficients of (A)-(E) may be used with respect to each i. Namely, the finite impulse response digital low pass filter 104 can be used the respective table faces of i=0, 3, 6, 9, 12 as the coefficients. The coefficient table shown in the Table 1 is memorized in the coefficient memory means 108 of FIG. 17. The coefficient decimation recurring means performs the process which obtain partial coefficient group by thinning by M−1=14 from the coefficient group of H(0)-H(899), and the process which recurs the partial coefficient group in the coefficient group of H(0)-H(899) by jumping the number of N-1 =2. Moreover, the above-mentioned coefficient decimation recurring means may be configurated by a ROM memorizing the above-mentioned process and a memory control means.

Figure 18:
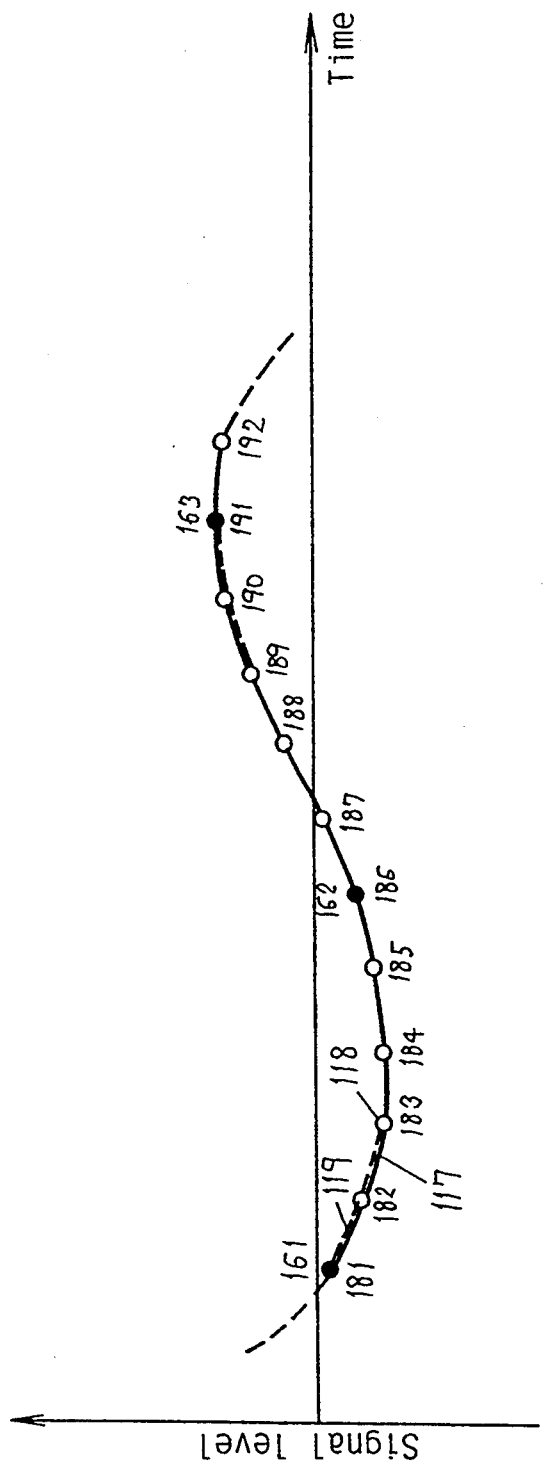
FIG. 18 is a waveform diagram showing interpolation in the fourth embodiment of the present invention.

FIG. 18 shows reproduction in 3/15 times speed. In FIG. 18, the input PCM samples are shown by 161-163, an input signal waveform is represented by 117. The interpolating samples of 181 -192 including an input sample are generated by performing convolutional calculation by using the partial coefficient group of (A)-(E) with respect to the one input sample, for example 161. In this case, the interpolating samples 181, 186, 191 are identical with the input samples 161,162, 163, respectively. The interpolating waveform is represented by 19 (sic), at this time, and has no large difference to the input signal waveform 117 by higher order interpolation; therefore, since the waveform distortion is little, excellent sound quality is reproduced.

Figure 19:
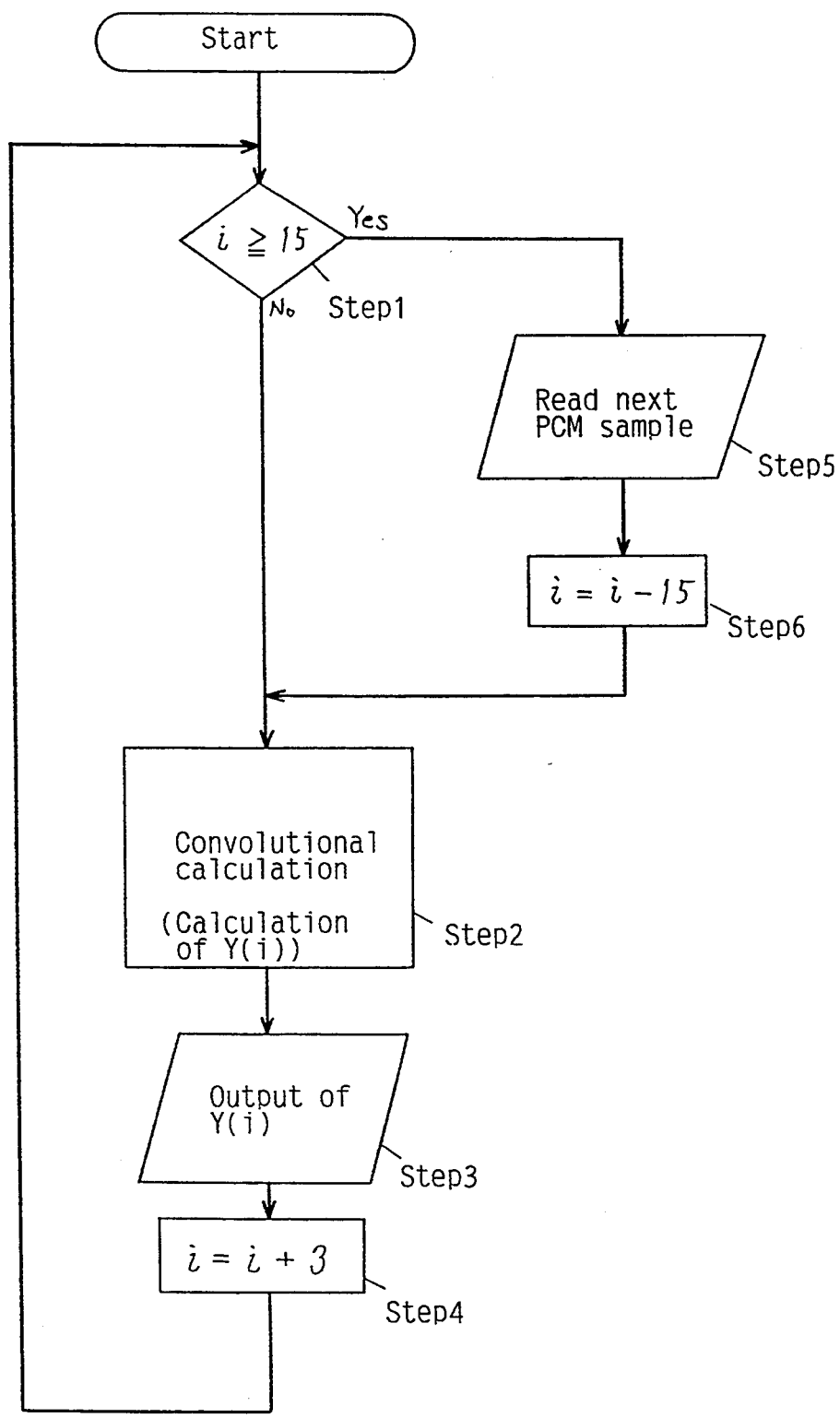
FIG. 19 is a flow chart in the fourth embodiment of the present invention.

The control means 112, for example, is composed of a ROM for memorizing the control process, a RAM which is used for memory and calculation of the rate ratio 115 and a memory control means. A schematic flow chart of the control means 112 in the present embodiment is shown in FIG. 19. In FIG. 19, at Step 1 it is determined whether i is 15 and below, and when it is 15 and below, the process is proceeded to convolutional calculation of Step 2. In Step 2, Y(i) shown in equation (2 ) is calculated by control of the above-mentioned coefficient table. Subsequently, advancing Step 3, Y(i) is output. In Step 4, i is increased by 3 and is returned to Step 1. In Step 1, when i is 15 or more, the flow advances to Step 5; and after read of subsequent PCM sample, 15 is subtracted from 1 in Step 6 and the flow advances to Step 2.

Figure 20:
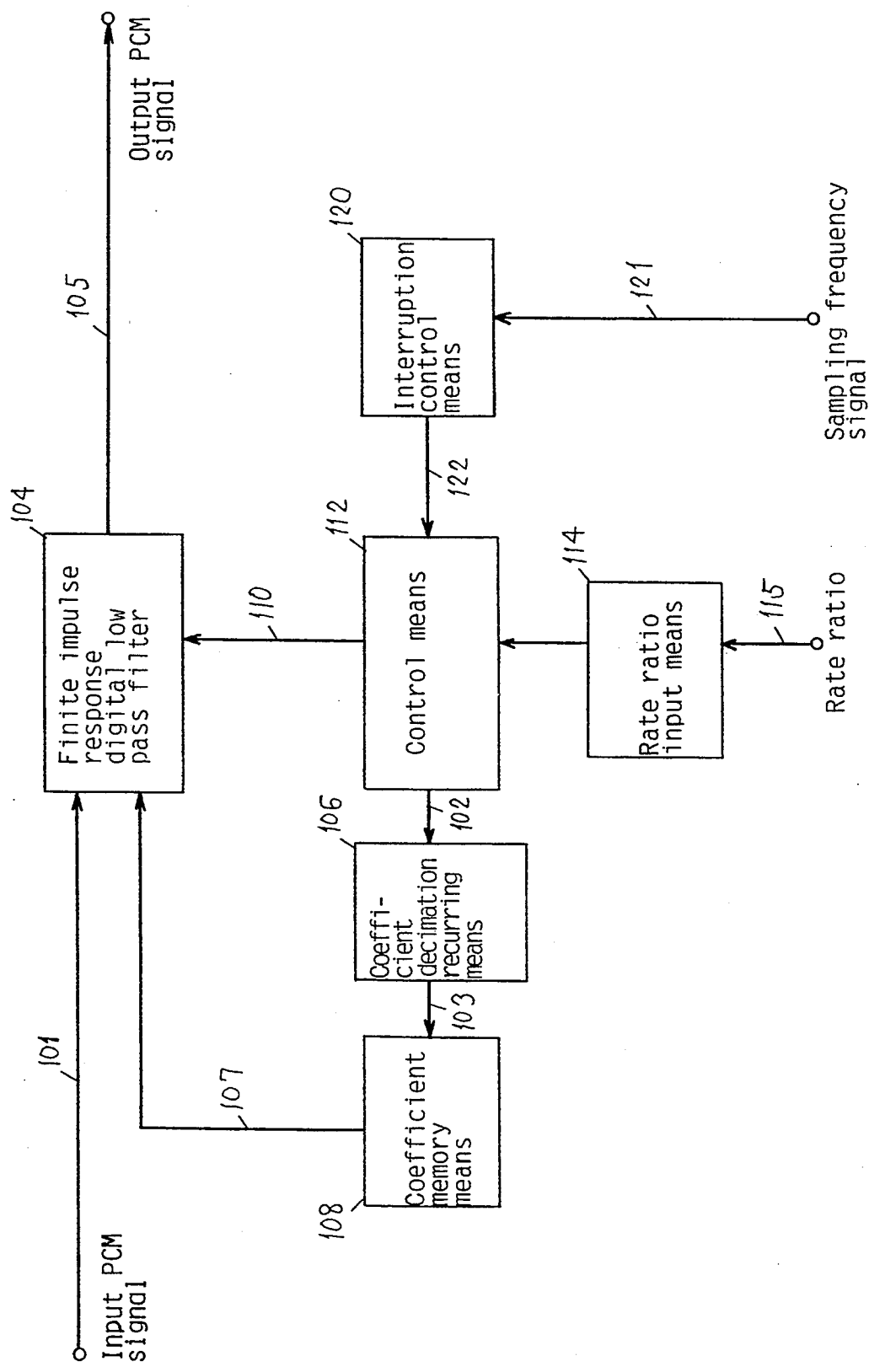
FIG. 20 is a block diagram showing configuration of the variable speed reproducing apparatus in the fifth embodiment of the present invention.

FIG. 20 is a block diagram showing a fifth embodiment of the present invention. Referring to FIG. 20, numerals 1-8, 10, 14-15 designate the identical structural elements with FIG. 17. Numeral 121 designates a sampling frequency signal having identical frequency with the sampling frequency; and the interrupting control means 120 generates interruption signal 122 by the sampling frequency signal 121, and applies to the control means 123. The control means 123 gives a command 110 for performing convolutional calculation to the finite impulse response digital low pass filter 104, and a command for thinning and recurring coefficients to the coefficient decimation recurring means 106 after reception of an interrupting signal 122.

Figure 21:
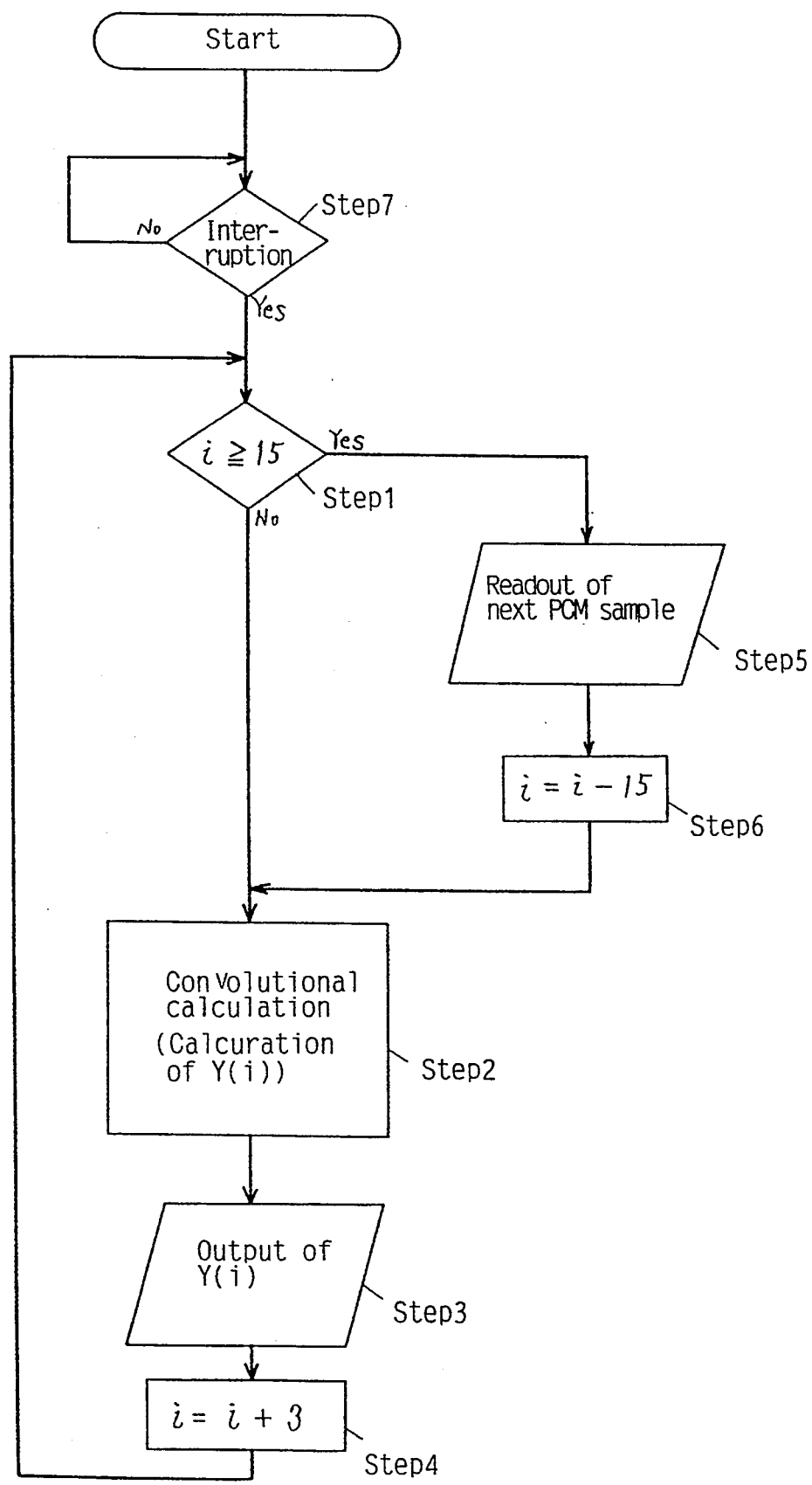
FIG. 21 is a flow chart in the fifth embodiment of the present invention.

This control is shown in the flow chart of FIG. 21.
In FIG. 21, Step 1-Step 6 are identical flow with ones in FIG. 19. Step 7 is a loop for waiting until reception of interruption at each sampling frequency.

As elucidated above, in the apparatus having the finite impulse response digital low pass filter, the rate ratio input means, coefficient memory means, coefficient decimation interpolating means and control means, the finite impulse response digital low pass filter can performs higher order interpolation by performing convolutional calculation of the coefficient of the recurred K tap and an input PCM sample, in variable speed reproduction, in case that reproduced sampling rate is lower than the output sampling rate namely in low speed reproduction, and the reproduction with excellent sound quality become possible.

Moreover, the sampling rate of tile output PCM sample is held to a constant, and interruption is applied to the above-mentioned control means every sampling frequency of the above-mentioned output PCM sample; and the above-mentioned finite impulse response digital low pass filter performs convolutional calculation of the coefficient of recurred K taps and input PCM sample and output PCM sample before subsequent interruption; and thereby the reproduction with excellent sound quality becomes possible in variable speed reproduction, and furthermore, the time control of the output of the PCM sample and the convolutional calculation can be made easy.

The ROMs for memorizing the control process shown in FIG. 19 and the process of coefficient decimation recurring means elucidated in the fourth embodiment can be formed by one ROM in a lump. The operation in this case is identical with the operation of the fourth and fifth embodiments.

Moreover, finite impulse response digital low pass filter 104 and the control means 112 and coefficient decimation recurring means 106 and coefficient memory means 108 can be formed by a digital signal processing chip (DSP) comprising a high speed multiplier, an adder, a RAM a ROM and a memory control circuit. Furthermore, the ROM memorizing the process of the coefficient decimation recurring means 106 elucidated in the fourth embodiment and the coefficient memory means 108 can be formed by an external ROM. The operation is identical with the fourth embodiment and fifth embodiment.

In the above-mentioned fourth embodiment, the case of the digital audio tape recorder is shown, but it is identical with respect to a digital video cassette recorder which records digital voice with digital image or apparatus which records digital voice with analog image.

INDUSTRIAL APPLICABILITY

In variable speed reproduction as mentioned above, it is detected whether a frame address is renewed or not, only in case of renewal, a PCM data of one frame is stored in a memory, and the PCM data is read at a frequency rate corresponding to a tape reproducing speed at that time, furthermore the interval of the read PCM data is interpolated by passing through an interpolating filter so as to become an original sampling rate, and can be output by converting to a frequency in proportional to a tape reproducing speed, and reproduction with excellent sound quality is possible.

Moreover, the finite impulse response digital low pass filter can perform higher order interpolation by convolutional calculation of the coefficient of recurred K tap and an input PCM sample in variable speed reproduction, in case that reproduction sampling rate is lower than the output sampling rate namely in constant speed reproduction (sic); and a variable speed digital signal reproducing apparatus which is capable of reproduction with excellent sound quality can be provided.

We claim:

1. A variable speed digital signal reproducing apparatus for reproducing a PCM audio signal recorded at an original sampling frequency, said PCM audio signal being recorded in oblique tracks formed on a tape with a rotary head, a predetermined number of said oblique tracks representing one frame of a video signal, said apparatus comprising:
   system control means for outputting tape running speed information in accordance with an operation mode,
   tape driving means for driving a tape in compliance with said tape running speed information,
   reproduction signal processing means for demodulating a reproduction signal from said rotary head, said reproduction signal being representative of said PCM audio signal recorded on said tape,
   memory means for storing said demodulated reproduction signal,
   reproduction signal renewal detection means for determining whether said demodulated reproduction signal is the same as the previous demodulated reproduction signal by comparing said demodulated reproduction signal with said previous demodulated reproduction signal when variable speed reproduction of said PCM audio signal recorded on said tape is performed based on said tape running speed information,
   memory control means for controlling write in of said demodulated reproduction signal to said memory means in compliance with a determination result output from said reproduction signal renewal detection means, and for controlling readout of said demodulated reproduction signal from said memory means at a sampling frequency in compliance with said tape running speed information, and
   interpolating filter means for interpolating said demodulated reproduction signal read from said memory means in accordance with said tape running speed information so that a frequency of said demodulated reproduction signal readout from said memory means equals said original sampling frequency.

2. A variable speed digital signal reproducing apparatus in accordance with claim 1, wherein
   said reproduction signal processing means separates and extracts a frame address attached to each frame of said recorded PCM audio signal, and
   said reproduction signal renewal detection means comprises auto-tracking means for controlling a mounted height of said rotary head so that said rotary head always tracks a predetermined track on said tape in variable speed reproduction of said tape, and frame address renewal determination means for determining whether said frame address output from said reproduction signal processing means is renewed or not.

3. A variable speed digital signal reproducing apparatus in accordance with claim 1, wherein
   said reproduction signal renewal detection means comprises a write time generating means for generating write timing of said demodulated reproduction signal to said memory means by inputting a control signal and a frame clock signal, said control signal of a frequency synchronized with a frame, the frame demodulated from a first track formed along the length direction of said tape using a stationary head, the first track independent of said oblique tracks, and said frame clock signal separated and extracted from said reproduction signal in said reproduction signal processing means, and auto-tracking means for controlling a mounted height of said rotary head so that said rotary head always tracks a predetermined track on said tape in variable speed reproduction of said tape.

4. A variable speed digital signal reproducing apparatus in accordance with claim 1, wherein said signal processing means corrects errors in said demodulated reproduction signal using an error correction code, and outputs said demodulated reproduction signal, an error correction result and a frame address in units of frame, said frame address and said error correction code are attached to said recorded PCM audio signal, said reproduction signal renewal detection means comprises a frame address renewal determination means for determining whether said frame address output from said reproduction signal processing means is renewed or not, and a memory write control means for controlling write to said memory means by said error correction result and output from said frame address renewal determination means.

* * * * *